(12) United States Patent
Agarwal et al.

(10) Patent No.: US 9,569,254 B2
(45) Date of Patent: Feb. 14, 2017

(54) AUTOMATIC CHECKPOINTING AND PARTIAL ROLLBACK IN SOFTWARE TRANSACTION MEMORY

(75) Inventors: Shivali Agarwal, Ghaziabad (IN); Monika Gupta, New Delhi (IN); Shyamasundar Rudrapatna Kallikote, Mumbai (IN)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 12/510,648

(22) Filed: Jul. 28, 2009

(65) Prior Publication Data
US 2011/0029490 A1 Feb. 3, 2011

(51) Int. Cl.
- *G06F 17/30* (2006.01)
- *G06F 9/46* (2006.01)
- *G06F 11/14* (2006.01)

(52) U.S. Cl.
CPC ............ *G06F 9/467* (2013.01); *G06F 11/141* (2013.01); *G06F 11/1438* (2013.01); *G06F 17/30359* (2013.01); *G06F 17/30578* (2013.01)

(58) Field of Classification Search
CPC ............... G06F 17/30115; G06F 17/30174; G06F 11/141; G06F 11/1474; G06F 17/30359; G06F 17/30578
USPC ............................ 707/684, 999.002, 999.008, 999.202,707/999.203; 711/118, 147, E12.001; 714/19, 714/E11.115; 718/101, 106
See application file for complete search history.

(56) References Cited

U.S. PATENT DOCUMENTS

| | | | |
|---|---|---|---|
| 6,629,153 B1 * | 9/2003 | Gupta et al. ................... | 719/316 |
| 7,363,538 B1 * | 4/2008 | Kundu ................ | G06F 11/1474 |
| | | | 707/999.202 |
| 2004/0068727 A1 * | 4/2004 | Zilles ...................... | G06F 8/456 |
| | | | 718/100 |
| 2005/0097078 A1 * | 5/2005 | Lohman ............ | G06F 17/30979 |
| 2006/0020570 A1 * | 1/2006 | Wu ................... | G06F 17/30359 |
| 2006/0156157 A1 * | 7/2006 | Haselden ............ | G06F 11/0793 |
| | | | 714/746 |
| 2006/0161516 A1 * | 7/2006 | Clarke et al. ..................... | 707/2 |
| 2007/0162520 A1 * | 7/2007 | Petersen et al. .............. | 707/202 |
| 2008/0098181 A1 * | 4/2008 | Moir et al. .................... | 711/152 |
| 2008/0120484 A1 | 5/2008 | Zhang et al. | |
| 2008/0162990 A1 * | 7/2008 | Wang et al. .................... | 714/19 |
| 2009/0113443 A1 * | 4/2009 | Heller, Jr. et al. ............ | 718/106 |

(Continued)

OTHER PUBLICATIONS

Jan-Willem Maessen, Arvind, Store Atomicity for Transactional Memory, Electronic Notes in Theoretical Computer Science, vol. 174, Issue 9, Proceedings of the Thread Verification Workshop (TV 2006), Jun. 22, 2007, pp. 117-137, ISSN 1571-0661, DOI: 10.1016/j.entcs.2007.04.009. (http://www.sciencedirect.com/science/article/pii/S1571066107003611).*

(Continued)

*Primary Examiner* — Alexey Shmatov
*Assistant Examiner* — Kurt Mueller
(74) *Attorney, Agent, or Firm* — Ryan, Mason & Lewis, LLP

(57) ABSTRACT

While speculatively executing a given one of a plurality of transactions concurrently executing on a computer, carry out write operations in a local data block, and automatically create an entry in a checkpoint log when reading from a shared memory. Continuously conflict check during read and tentative commit operations, and carry out a partial rollback upon detection of a conflict. The partial rollback is based upon the checkpoint log.

14 Claims, 19 Drawing Sheets

(56) References Cited

U.S. PATENT DOCUMENTS

| | | | |
|---|---|---|---|
| 2010/0011026 A1* | 1/2010 | Saha | G06F 17/30 |
| | | | 707/E17.005 |
| 2010/0122041 A1* | 5/2010 | Nakaike et al. | 711/147 |
| 2010/0153660 A1* | 6/2010 | Lasser | 711/154 |
| 2010/0162247 A1* | 6/2010 | Welc et al. | 718/101 |
| 2011/0016470 A1* | 1/2011 | Cain et al. | 718/101 |

OTHER PUBLICATIONS

Luis Ceze, James Tuck, Josep Torrellas, and Calin Cascaval. 2006. Bulk Disambiguation of Speculative Threads in Multiprocessors. SIGARCH Comput. Archit. News 34, 2 (May 2006), 227-238. DOI=10.1145/1150019.1136506 http://doi.acm.org/10.1145/1150019.1136506.*

Anderson et al., Thread Management for Shared-Memory Multiprocessors, 91, www.cs.washington.edu/homes/tom/pubs/threads.ps.

Cohen et al., Verifying Correctness of Transactional Memories, in FMCAD, 07, www.marktuttle.com/papers/cohen-oleary-pnueli-tuttle-zuck-fmcad07.pdf.

Dice et al., What Really Makes Transactions Faster. In Transact 06, ww.cs.tau.ac.ii/~shanir/nir-pubs-web/Papers/TRANSACT06.pdf.

Dice et al., Transactional Locking II, DISC, 06. R. Ennals. Software transactional memory should not be obstruction-free, www.cambridge.intel-research.net/srennals/notlockfree.pdf.

Fraser et al., Concurrent programming without locks, ACM Trans. Comput. Syst., 07. www.research.microsoft.com/en-us/um/people/tharris/papers/2007-tocs.pdf.

Gottschlich et al., DracoSTM: A Practical C++ Approach to Software Transactional Memory, ACM SIGPLAN Symposium on LCSD, 07. www.roque.colorado.edu/draco/papers/lcsd-07-stm.pdf.

Harris et al., Abstract nested transactions. In TRANSACT, 07. www.research.microsoft.com/en-us/um/people/tharris/papers/2007-ant.pdf.

Harris et al., Optimizing memory transactions. SIGPLAN No., 06, www.research.microsoft.com/en-us/um/people/tharris/papers/2006-pldi.pdf.

Herlihy et al., Transactional boosting: a methodology for highly-concurrent transactional objects. In PPoPP, 08. www.cs.brown.edu/~ejk/papers/boosting-ppopp08.pdf.

Koskinen et al., Checkpoints and continuations instead of nested transactions. In SPAA, 08. www.cl.cam.ac.uk/~ejk39/papers/checkpoints.pdf.

Rajwar et al., Transactional Memory, Morgan and Claypool, 06. www.portal.acm.org/citation.cfm?id=1364800.

Moore et al., LogTM: log-based transactional memory. HPCA, 06. www.cs.wisc.edu/multifacet/papers/hpca06_logtm.pdf.

Moravan et al., Supporting nested transactional memory in logTM. SIGPLAN Not., 06, www.portal.acm.org/citation.cfm?id=1168918.1168902.

Ni et al., Open Nesting in Software Transactional Memory, In PPoPP, 07, www.portal.acm.org/citation.cfm?id=1229442.

Simon Peyton-Jones, Beautiful Concurrency. O'Reilly, 07. www.research.microsoft.com/en-us/um/people/simon.

Michael L. Scott, Sequential Specification of Transactional Memory Semantics. In TRANSACT, 06. doi: www.cs.rochester.edu/u/scott/papers/2006_TRANSACT_formal_STM.pdf.

Shpeisman et al., Enforcing isolation and ordering in STM. SIGPLAN Not., 07. doi: www.cs.washington.edu/homes/djg/papers/tm_pldi07.pdf.

Waliullah et al., Intermediate checkpoint with conflicting access prediction in transactional memory systems. In IPDPS, 08, doi: www.ieeexplore.ieee.org/xpls/abs_all.jsp?arnumber=4536249.

Adl-Tabatabai et al., Compiler and Runtime Support for Efficient Software Transactional Memory, PLDI'06 Jun. 10-16, 2006, Ottawa, Ontario, Canada, pp. 26-37.

Shavit et al., Software Transactional Memory, 14th ACM Symposium on the Principles of Distributed Computing, Ottowa, Ontario, Canada, 1995, pp. 0-33.

Robert Ennals, Software Transaction Memory Should Not Be Obstruction-Free, Intel Corporation 2006, IRC-TR-06-052, pp. 1-10.

* cited by examiner

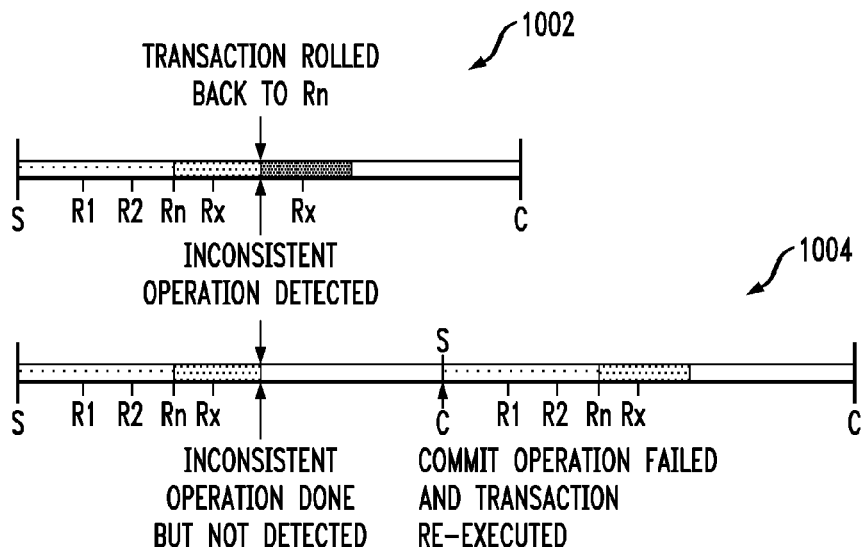

FIG. 5A

| input | $t$ : transaction identifier |
|---|---|
| | $o$ : a local/shared object |
| | $d$ : some value to be assigned to object o |
| | $O$ : a subset of shared objects |

1. CaPRA()
2. begin
3.   foreach (*active_transaction t*) do
4.     while (*more_operations_left_for_t*) do
5.       if (*next_operation = read_object_o*) then
6.         invoke *Read(t, o)*;
7.       elseif (*next_operation = write_object_o*) then
8.         invoke *WriteLocal(t, o, d)*;
9.       elseif (*next_operation = commit_t*) then
10.         invoke *Commit(t)*;
11.       elseif (*next_operation = partially_rollback_t*) then
12.         invoke *PartiallyRollback(t, O)*;
13.       endif;
14.     endwhile;
15.   endfor;
16. end;

1. Read(o, t)
2. begin
3.   if (*color_of_t's_conflict_flag = RED*) then
4.     *next_operation = partially_rollback_t*;
5.   else
6.     if (*o_in_t's_local_data_block*) then
7.       *read_o_from_local_data_block*;
8.     elseif (*o_in_t's_shared_object_store and o_is_in_sync*) then
9.       *read_o_from_shared_object_store*;
10.     else
11.       *read_o_from_shared_memory*;
12.       *add_t_to_o's_reader_list*;
13.       *create_entry_for_o_in_local_data_block*;
14.       *create_entry_for_o_in_shared_object_store*;
15.       *create_entry_for_o_in_checkpoint_log*;
16.     endif;
17.   endif;
18. end;

1. WriteLocal(o, d, t)
2. begin
3.   *update_o_in_local_data_block*;
4. end;

FIG. 5B

```
1.   PartiallyRollback(O, t)
2.   begin
3.      identify_safest_checkpoint_to_rollback;
4.      apply_selected_checkpoint's_continuation;
5.      reset_status_flag_to_green;
6.      proceed_with_the_new_program_location;
7.   end 1.   Commit(t)
2.   begin
3.      rollback = false;
4.      while (t_not_selected_by_scheduler) do
5.         if (color_of_t's_confilict_flag = RED) then
6.            next_operation = partially_rollback_t;
7.            rollback = true;
8.            break;
9.         endif;
10.     endwhile;
11.     if (rollback = false) then
12.        write_desired_shared_memory_objects;
13.        raise_conflicts_for_conflicting_transactions;
14.        drop_t_from_active_transactions_list;
15.     endif;
16.  end;
```

FIG. 6

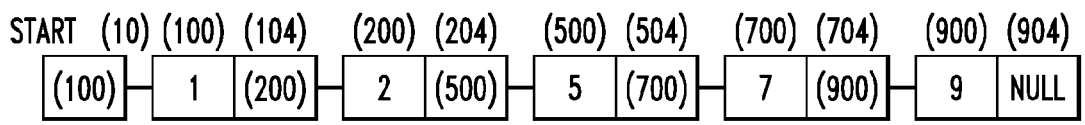

FIG. 7

```
function insertNode
   input val : value of the new node to be inserted
         start : pointer to the first node in the linked list 1.  begin
2.     tx = startTx();
3.     currNode = readTx(start, tx);
4.     prevNode = readTx(currNode, tx);
5.     currVal = readTx(currNode.val, tx);
6.     while (currVal < val) do
7.        prevNode = readTx(curNode, tx);
8.        currNode = readTx(currNode.next, tx);
9.        currVal = readTx(currNode.val, tx);
10.    endwhile;
11.    newNode = new ListNode(val, currNode);
12.    if (currNode == start) then
13.       writeTx(start, newNode, tx);
14.    else
15.       writeTx(prevNode.next, newNode, tx);
16.    endif;
17.    commitTx(tx);
18. end;
```

FIG. 23
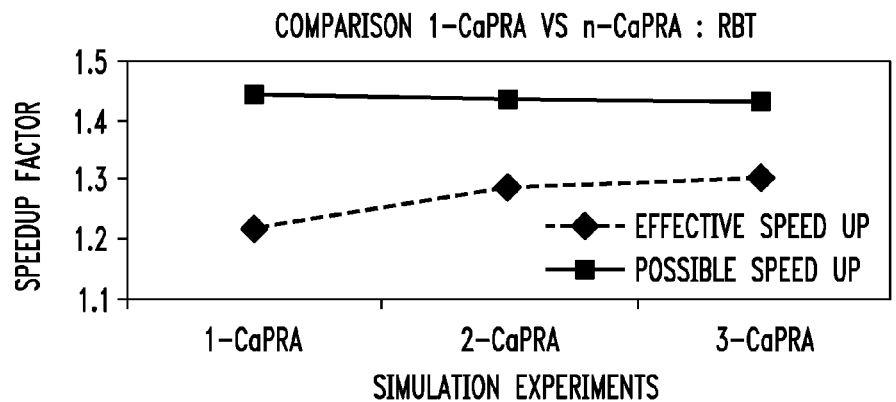
FIG. 24
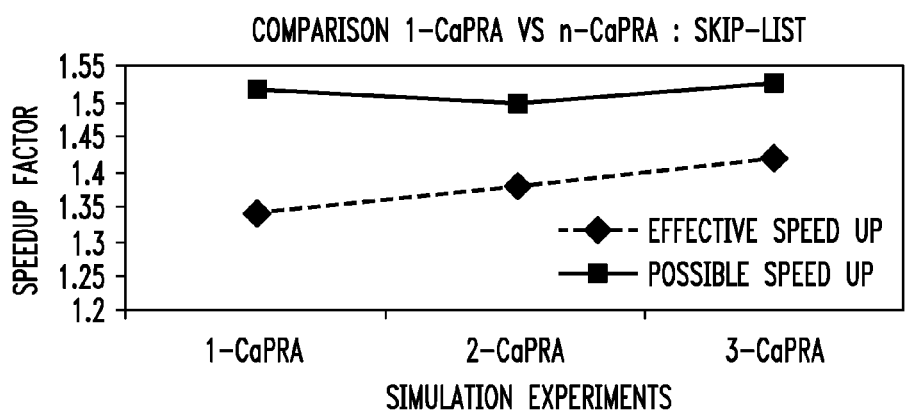
FIG. 25
| APPLICATION | NUMBER OF OPERATIONS | NUMBER OF CHECKPOINTS | | |
|---|---|---|---|---|
| | | 1-CaPRA | 2-CaPRA | 3-CaPRA |
| SKIP-LIST | 65-80 | 5-8 | 3-4 | 2-3 |
| RED-BLACK-TREE | 65-80 | 5-8 | 3-4 | 2-3 |
| HASH-TABLE | 15-25 | 1-3 | 1-2 | 1 |

AUTOMATIC CHECKPOINTING AND PARTIAL ROLLBACK IN SOFTWARE TRANSACTION MEMORY

FIELD OF THE INVENTION

The present invention relates to the electrical, electronic and computer arts, and, more particularly, to concurrent programming and the like.

BACKGROUND OF THE INVENTION

Recent advances in multicore architectures increase the desirability of efficient concurrent programming mechanisms to achieve performance scaling. Concurrent programming techniques, particularly, the conventional mutual exclusion primitives such as monitors and locks, are quite complex, both from the perspective of programming and reasoning. One of the attractive alternative approaches has been the paradigm of concurrent programming without locks. There has been a growing consensus that transactions, the long-time foundations of database systems, should provide a simple, powerful mechanism for synchronization over multiple objects. Sequences of object references can be grouped to form transactions and each such transaction can be treated as an atomic execution unit. Programmers can focus on the atomicity requirements rather than the implementation details of synchronization. These explorations have lead to the abstraction of Transactional Memory (TM). TM systems can be classified as either Software TMs (STMs) or Hardware TMs (HTMs), based on whether data-conflicts are resolved in software or hardware. A Software Transactional Memory (STM) is a concurrency control mechanism that executes multiple concurrent, optimistic, lock-free, atomic transactions, thus alleviating many problems associated with conventional mutual exclusion primitives such as monitors and locks.

SUMMARY OF THE INVENTION

Principles of the invention provide techniques for automatic checkpointing and partial rollback in software transaction memory. In one aspect, an exemplary method (which can be computer-implemented) includes carrying out the following steps while speculatively executing a given one of a plurality of transactions concurrently executing on a computer: carrying out write operations in a local data block; automatically creating an entry in a checkpoint log when reading from a shared memory; continuously conflict checking during read and tentative commit operations; and carrying out a partial rollback upon detection of a conflict in the conflict checking step. The partial rollback is based upon the checkpoint log.

One or more embodiments of the invention or elements thereof can be implemented in the form of a computer product including a tangible computer readable recordable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable recordable storage medium (or multiple such media).

One or more embodiments of the invention may offer one or both of the following technical benefits:

Increase in performance of conflicting transactions, especially when transactions are lengthy, or share a good number of objects amongst themselves, without overburdening non-conflicting transactions.

A framework for providing deadlock-freedom, livelock-freedom and starvation-freedom.

These and other features, aspects and advantages of the invention will become apparent from the following detailed description of illustrative embodiments thereof, which is to be read in connection with the accompanying drawings.

BRIEF DESCRIPTION OF THE DRAWINGS

FIG. 1 presents a comparison of partial rollback with full abort schemes;

FIG. 2 shows an exemplary global workspace, according to an aspect of the invention;

FIGS. 5A and 5B present pseudo code for an exemplary implementation of an automatic checkpointing and partial rollback technique, according to still another aspect of the invention;

FIG. 6 depicts an exemplary linked list;

FIG. 7 presents pseudo code for an exemplary insert operation on the list of FIG. 6;

FIG. 23 compares speed up factors for RBT for a basic technique and techniques of level n;

FIG. 24 compares speed up factors for skip lists for a basic technique and techniques of level n;

FIG. 25 is a table showing number of operations and checkpoints in the three applications skip list, red-black tree, and hash-table;

DETAILED DESCRIPTION OF PREFERRED EMBODIMENTS

Figure 3:
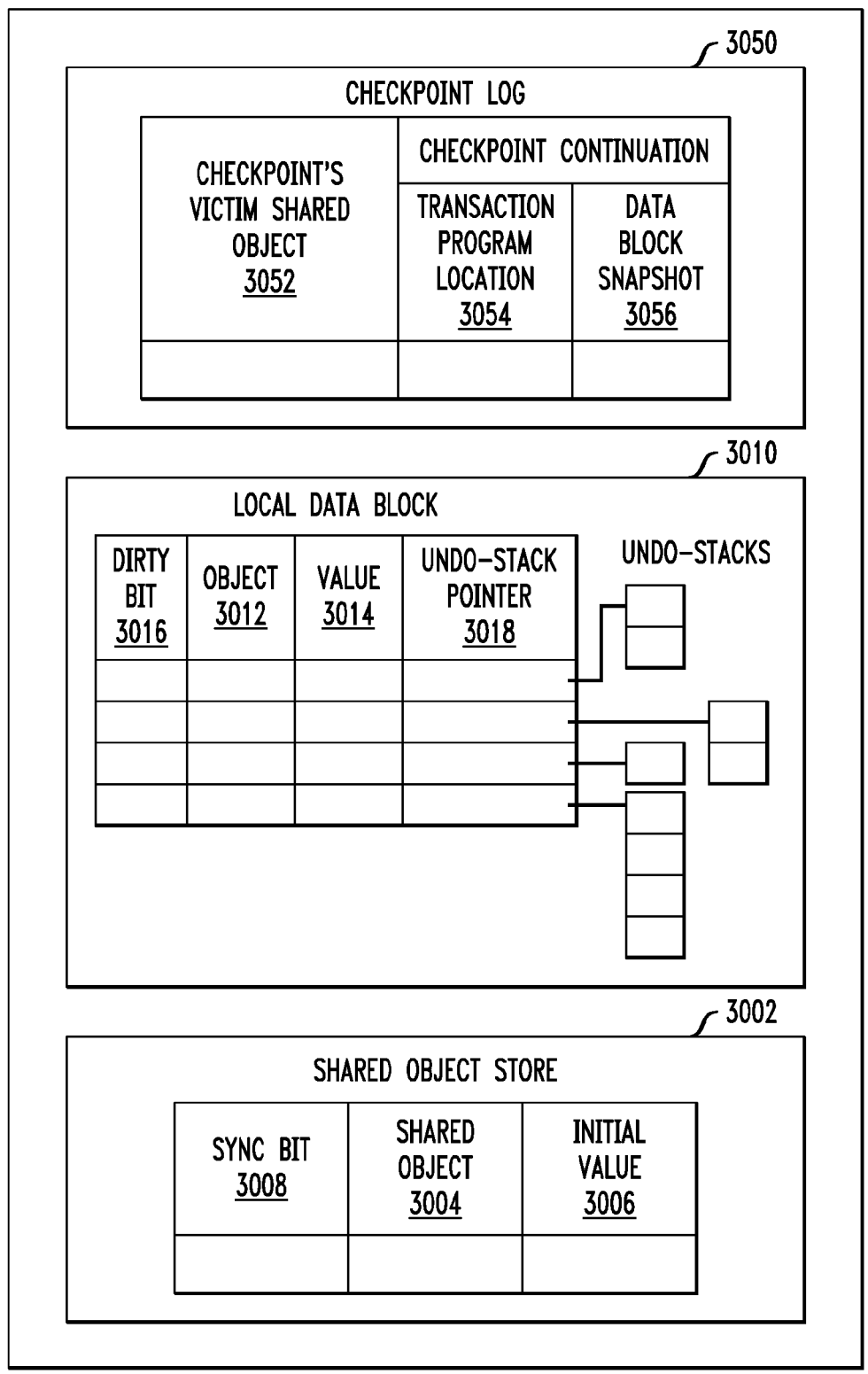
FIG. 3 shows an exemplary transaction local workspace, according to another aspect of the invention.

One or more embodiments of the invention provide one or more of an apparatus, method, and computer program product which implement out one, some, or all of the following:

Continuous conflict detection in STMs, for faster conflict detection in the presence of several concurrent transactions, each executing in its own local workspace.

Automatic checkpointing in STMs, which allows automatic detection and creation of checkpoints as transactions proceed in their local workspace.

Partial rollback in STMs based on automatic checkpointing and continuous conflict detection, which allows transactions to partially roll back their operations; this characteristic leads to enhanced performance realization of STMs.

Hierarchical characterization of an Automatic Checkpointing and Partial Rollback Technique (CaPRA) (n-CaPRA for some integer n) providing a tradeoff of performance and overhead.

Intelligent clustering of checkpoints in Automatic Checkpointing and Partial Rollback Technique (CaPRA) to reduce checkpointing overheads.

A framework for providing deadlock-freedom, livelock-freedom and starvation-freedom.

As noted, an STM is a concurrency control mechanism that executes multiple concurrent, optimistic, lock-free, atomic transactions, thus alleviating many problems associated with conventional mutual exclusion primitives such as monitors and locks. One or more embodiments of the invention implement the above-mentioned CaPRA, for realizing software transaction memories; CaPRA is based on continuous conflict detection, lazy versioning with automatic transaction checkpointing and partial rollback. CaPRA differs from existing STM techniques and, in one or more embodiments, has one, some, or all of the following characteristic features:

automatically checkpoints transactions as they progress, does a continuous conflict detection with lazy versioning to identify potentially inconsistent transactions at their early stages of execution, rather than at their commit time, for each invalidated transaction, identifies a suitable checkpoint to which the transaction should be unrolled to make it consistent, uses an economic partial rollback operation which replaces costly, conventional transaction abort operation; this feature enables better performance, especially when the transactions are lengthy, include costly operations, and/or involve large number of shared objects, and provides a commit arbitration function that allows every ready-to-commit transaction to eventually commit itself.

Purely for purposes of illustration and example, and not for purposes of limiting the scope of the invention, embodiments of the invention have been simulated on different applications, the overheads have been assessed, and measures to reduce the overheads have been arrived at. Non-limiting exemplary results indicate that in one or more embodiments, even with pessimistic assumptions, one or more embodiments deliver a speedup of 18% to 30% for conflicting transactions.

As noted, recent advances in multicore architectures increase the desirability of efficient concurrent programming mechanisms to achieve performance scaling. Concurrent programming techniques, particularly, the conventional mutual exclusion primitives such as monitors and locks, are quite complex, both from the perspective of programming and reasoning. One of the attractive alternative approaches has been the paradigm of concurrent programming without locks. There has been a growing consensus that transactions, the long-time foundations of database systems, should provide a simple, powerful mechanism for synchronization over multiple objects. Sequences of object references can be grouped to form transactions and each such transaction can be treated as an atomic execution unit. Programmers can focus on the atomicity requirements rather than the implementation details of synchronization. These explorations have lead to the abstraction of Transactional Memory (TM). TM systems can be classified as either Software TMs (STMs) or Hardware TMs (HTMs), based on whether data-conflicts are resolved in software or hardware. A Software Transactional Memory (STM) is a concurrency control mechanism that executes multiple concurrent, optimistic, lock-free, atomic transactions, thus alleviating many problems associated with conventional mutual exclusion primitives such as monitors and locks.

One or more embodiments of the invention provide an STM system, as well as a technique for its realization. Shared memory acts as a large database which is shared by multiple isolated transactions and/or execution threads. STM provides atomicity and isolation of the sequential code executed within a transaction by appropriately committing and/or aborting them. Several metrics have been used to classify existing STM implementations, some of which are listed below:

(1) When does a transaction actually update its desired shared objects: STM implementations are classified as being either Eager Versioning or Lazy Versioning implementations. Eager versioning implementations are typically lock-based blocking implementations, where transactions modify data in-place by using undo logs. Lazy versioning implementations are non-blocking implementations, where transactions usually execute by making a private working copy of the shared objects, and, when completed, swap their working copy with the global copy. The extra level of indirection in lazy versioning implementation assures that both committing and aborting are light-weight operations, and that the objects read during a transaction are immutable.

(2) When does a transaction detect a conflict with another transaction in the system: STM implementations can be classified as being either Eager Conflict Detecting or Lazy Conflict Detecting implementations. While in an eager conflict detecting implementation, conflicts are detected as a transaction proceeds, in lazy conflict detecting implementations conflicts are detected only at commit time.

(3) How do transactions commit themselves: A "Commit" operation in an STM is either a lock-free operation or a locking operation. A lock-free operation is based on indirection and uses compare-and-swap (CAS) to swap old copies with new copies. A locking operation uses either encounter-time locking or commit-time locking. The skilled artisan will be familiar with encounter-time locking or commit-time locking per se. In encounter time locking, memory writes are done by first temporarily acquiring a lock for a given location, writing the value directly, and then logging it in the undo log. Commit-time locking uses a two-phase locking scheme, that is, it locks all memory locations during the first phase (called acquire phase) and updates and unlocks them in the second phase (called commit phase).

Transaction abort is an important STM mechanism for canceling the effects of operations executed within a transaction, often incurring significant costs. These costs result from the fact that each aborted transaction needs to be re-activated, re-scheduled, and re-executed. A so-called partial rollback operation can be used to unroll only parts of the operations executed in a transaction back to a checkpoint that can be set by either the system or the programmer—thus reducing many of the overheads associated with the full transaction abort.

Embodiments of the invention provide one or more of:
A new conflict detection scheme called Continuous Conflict Detection where conflicts are generated as transactions commit and then signaled to other concurrently executing, conflicting transactions.
An automatic transaction checkpointing and partial rollback based STM technique for STM realization called Automatic Checkpointing and Partial Rollback (CaPRA) technique; the appropriateness of one or more embodiments of such CaPRA technique is illustrated herein, and in one or more embodiments, the same is deadlock-free.
Techniques to determine and reduce CaPRA's overheads.
Based on exemplary and non-limiting simulation experiments, CaPRA can, in at least some instances, deliver a speedup of 18% to 30% for conflicting transactions.

Formal Model of STM

A transaction is a sequence of the following operations performed by a single thread:
1) start(t)—Starts a new transaction T, where t is a unique time stamp based transaction descriptor passed to its operations.
2) read(o,t)—Returns the value of the object o as read from T's local data block; however, if o does not exist in T's local data block, its value is read from the shared memory and cloned in the local data block.
3) writelocal(o,d,t)—Transaction T locally writes the value d to the object o. Embodiments of CaPRA allow transactions to progress locally using a local data block, and update the shared memory object only when they commit.
4) checkpoint(o,σ,t)—Transaction T creates a new checkpoint entry for the shared object o with σ as the corresponding local data block snapshot (referred to herein as continuation).
5) rollback($\mathcal{O}$,t)—Let $\mathcal{O}$ be some subset of objects read by transaction T. This operation rolls back transaction T to the earliest point in T, where it first read the value of any of the objects o ∈ $\mathcal{O}$.
6) commit(t)—Initiates the commit process for transaction T.
7) write(o,d,t)—As a part of the commit operation, transaction T actually writes the value d to the shared memory object o.

A transaction in CaPRA is defined as (start(read|writelocal|rollback|checkpoint)*(commit)(write)*). The model eliminates imposed aborts from the system; however, it may still be used to force kill the required transaction. In existing STM techniques, an inconsistent transaction needs to do an (imposed) abort; CaPRA instead partially rolls back such transactions to some previous consistent state.

A history H is a finite sequence of transaction operation events, each of which is tagged with its arguments, and with the transaction identifier of the calling transaction. The function $<_H$, dictates an ordering on the operations in the history H. For instance, read(o, t)$<_H$ write(o, d, s) indicates that, in history H, transaction T did a read operation on object o, before the write operation on object o by transaction S.

In any specification, a conflict function C specifies when two transactions cannot both succeed. CaPRA, in one or more embodiments, introduces a variant of the lazy invalidation conflict function, called the continuous invalidation conflict function.

A continuous invalidation conflict, $C_{capra}$, is defined as follows—transactions S and T conflict in history H, if there exist operations r=read(o, t) in T, and w=write(o, d, s) in S, such that S successfully did a commit(s) operation and r$<_H$ commit(s).

The definition of continuous invalidation conflict employed herein differs from the definition of lazy invalidation conflict employed in Michael L. Scott, Sequential Specification of Transactional Memory Semantics, in TRANSACT, 06, as follows: in a lazy invalidation conflict, the transaction T has to reach all the way to the end to detect a conflict, whereas, in continuous conflict detection, the transaction T is signaled about the conflict immediately after the commit(s) operation.

In any specification, an arbitration function, A, is used to resolve transaction conflicts. In one or more embodiments of CaPRA, arbitration is required when multiple transactions are ready-to-commit, i.e. which among these ready-to-commit transactions should be chosen to commit?

A commit arbitration function, $A_{capra}$, is defined as follows—let α denote the set of transactions that are ready to commit other than T. Then for some U ∈ α, $A_{capra}$(H,U,T) =true implies that in history H, transaction T is chosen to commit and vice-versa. Further, $A_{capra}$(H,U,T )=true, if either $C_{capra}$(H,U,T)=false (that is transactions U and T do not conflict with each other) or $C_{capra}$(H,U,T)=true & u≻t (u and t are corresponding transaction identifiers). In other words, if transaction T wants to commit, then it will not succeed, until there exist transactions that conflict with T and have a lower identification number than t.

Under the assumption that a transaction reaches the ready-to-commit state quite often, it is easy to see that a transaction will eventually have the lowest identification number and will be able to commit.

Advantages of using rollbacks in STMs as captured in instances of CaPRA, as may be achieved in one or more embodiments of the invention, will now be described. FIG. 1 compares the execution time of a transaction 1002 using CaPRA, with a transaction 1004 using lazy conflict detection followed by full transaction abort (e.g. as in TL2 implementation). TL2 is yet another STM implementation technique that is based on speculative execution, lazy conflict detection and lazy versioning. In contrast to one or more embodiments of CaPRA, it aborts a transaction fully when a conflict is detected. In the first case, the transaction did some inconsistent operations that got detected at, say, $R_i$, and the transaction immediately rolled back to some earlier checkpoint $R_n$. In the second case, the inconsistent operation was done, but was not detected until commit time (due to lazy conflict detection) and hence, the full transaction proceeded, later aborted and re-executed itself. Assuming that in both the cases, the transactions finally went through without any conflicts the second time, the comparison clearly illustrates the desirability of partial rollbacks over full transaction aborts. Note that, in general, an inconsistent operation refers to some shared object read or write operation of a transaction which is not considered safe to commit in an implementation.

Formal Description of CaPRA

One or more embodiments of CaPRA abstract the shared memory as a set of shared objects. Described below are exemplary data structures used in one or more embodiments of the CaPRA framework.

Global List of Active Transactions: Embodiments of the technique require the system to maintain a dynamic, global list of active transactions, an example 2002 of which is shown in FIG. 2. Entries in this list are created and/or removed as new transactions enter and/or leave the system. Note that at all times the size of this list remains restricted by the number of active transactions. Each entry in this list marks the current status of an active transaction in the system, and contains the following:

1) A unique transaction identifier 2004.
2) A status-flag (a bit field) 2006 indicating the status of the corresponding transaction. A "0" status-flag (henceforth called the green flag and represented in the figures by lighter shading) indicates that the corresponding transaction can readily proceed, while a "1" status-flag (henceforth called the red flag and represented in the figures by darker shading) indicates a possible conflict with one or more already committed transactions, and hence signals the transaction to initiate a partial rollback operation.
3) A possibly null conflict pointer 2008 which points to an entry in the conflict event store described below.

Conflict Events Store: Conflict events are recorded in the conflict events store 2010 of FIG. 2, with the following information:

1) The write-set 2012 of the conflict event, that is, the set of those shared memory objects whose update (by some committing transaction) generated the conflict, and
2) The number of active transactions 2014 that are currently referring to this conflict event.

Active Readers List: Each shared object 2020 in shared memory 2016 of FIG. 2 is augmented with a dynamic list of active reader transactions 2018, that is, a list of those transactions (identifiers) which are currently using the shared object's value 2022 (either for reading or for updating). This list grows as new transactions read the shared object's value, and shrinks as transactions rollback or commit. Again, note that for any shared object, this list can grow in size to at most the number of active transactions in the system, and hence restricted at all times.

Shared Object Store and Local Data Block: Each transaction in CaPRA maintains a local data block and a shared object store for all the local and/or shared objects it needs to read and/or write. Whereas a local data block stores the current values of all the local and/or shared objects being used by the transaction, the shared object store stores the initial values of only the shared objects as read from the shared memory.

Granularity of Shared Objects: A shared object in its finest form can be a simple data type such as an integer, float, character, and the like, or, it can be coarse as a user-defined data type, for example, a link-list node. The manner in which the granularity of these shared objects dictates CaPRA overheads is discussed below. Note that an exemplary implementation of the CaPRA technique can provide programming application program interfaces (APIs) to allow programmers to declare shared objects in their programs.

Shared Object Store: Each entry in the shared object store 3002 of FIG. 3 includes the following: (1) the shared object 3004, (2) its initial value 3006 as read from the shared memory, and (3) a sync-bit 3008 indicating whether or not this value is in-sync with the object's current value in the shared memory. Values of shared objects read from shared memory are updated in the shared object store (and also in local data block 3010) and the corresponding sync-bit is set to "1" to indicate an in-sync value. As a transaction conflicts, some of these shared objects become victims of conflict and their values go out-of-sync (a "0" sync-bit) with the corresponding values in the shared memory, beyond which point the transaction needs to re-read these objects from the shared memory.

Local Data Block: Each entry in the local data block 3010 of FIG. 3 includes the following: (1) the local and/or shared object 3012, (2) its current value 3014 in the transaction, (3) a dirty-bit 3016 indicating whether or not the object's value has been updated since the last checkpoint, and, (4) a pointer 3018 to the object's undo-stack. Each local and/or shared object in the transaction maintains an undo-stack to trace its different values at different checkpoints.

As a transaction proceeds, various read and/or write requests are served as follows:

All shared object read requests are directed to the local data block, if not served there, are redirected to the shared object store, and if not served there also, are redirected to the shared memory and subsequently cloned in the shared object store and local data block for further read and/or write requests.

All local object read requests get served through the local data block.

All writes are done in the local data block and the corresponding dirty-bits for the objects being written are set.

Checkpoint Log: A checkpoint log 3050 in FIG. 3 is essentially a variant of an undo-log, and is used to partially rollback transactions. Each entry in the checkpoint log contains the following: (1) one or more victim shared objects 3052 whose read initiated the log entry, (2) a program location 3054 from where the transaction should proceed after a rollback, and (3) the current snapshot 3056 of the transaction's local data block, which is essentially a list of various undo-stack pointers for various shared and local data objects.

Having described various data structures, an exemplary technique itself will now be described.

Speculative Execution and Lazy Versioning: The technique speculatively executes each transaction using a local data block. All writes occur in the local data block, and only when a transaction commits, the local data block is used to update shared memory objects. Thus, CaPRA uses lazy versioning for updating shared objects.

Automatic Checkpointing (Candidate Checkpoints): In embodiments of CaPRA, first read operations on the shared objects are treated as candidate checkpoints. The reasoning behind this proposition is as follows: each transaction in the system speculatively executes using a local data block. The actual shared objects are lazily updated during the transaction's commit operation. While a transaction is locally executing, some other transactions may commit, and hence, some or all of the shared objects that were read by this transaction may get updated. In such a case, this not yet completed transaction, which had read the old values of the now updated shared objects, becomes inconsistent, and needs to rollback to the first point, where the value of any of these shared objects were first read from the shared memory. Thus, the first read operations on the shared objects are candidate checkpoints in a transaction. Not every candidate checkpoint necessarily results in a new checkpoint log entry. As will be discussed later, a candidate checkpoint might get merged with earlier checkpoint log entries or can result in a new checkpoint log entry.

Automatic Checkpointing (Creating a Checkpoint Log Entry): Upon encountering a candidate checkpoint for which a new checkpoint log entry has to be created, a transaction does the following: for all the local and/or shared objects in its local data block which have their dirty bits set, the transaction pushes their current values in their respective undo-stacks and resets their dirty-bits. It then captures the current continuation, which, in one or more embodiments, includes the current values of the various undo-stack pointers in the local data block, and the transaction's program location. Subsequently, it creates an entry in the transaction's checkpoint log.

Figure 4:
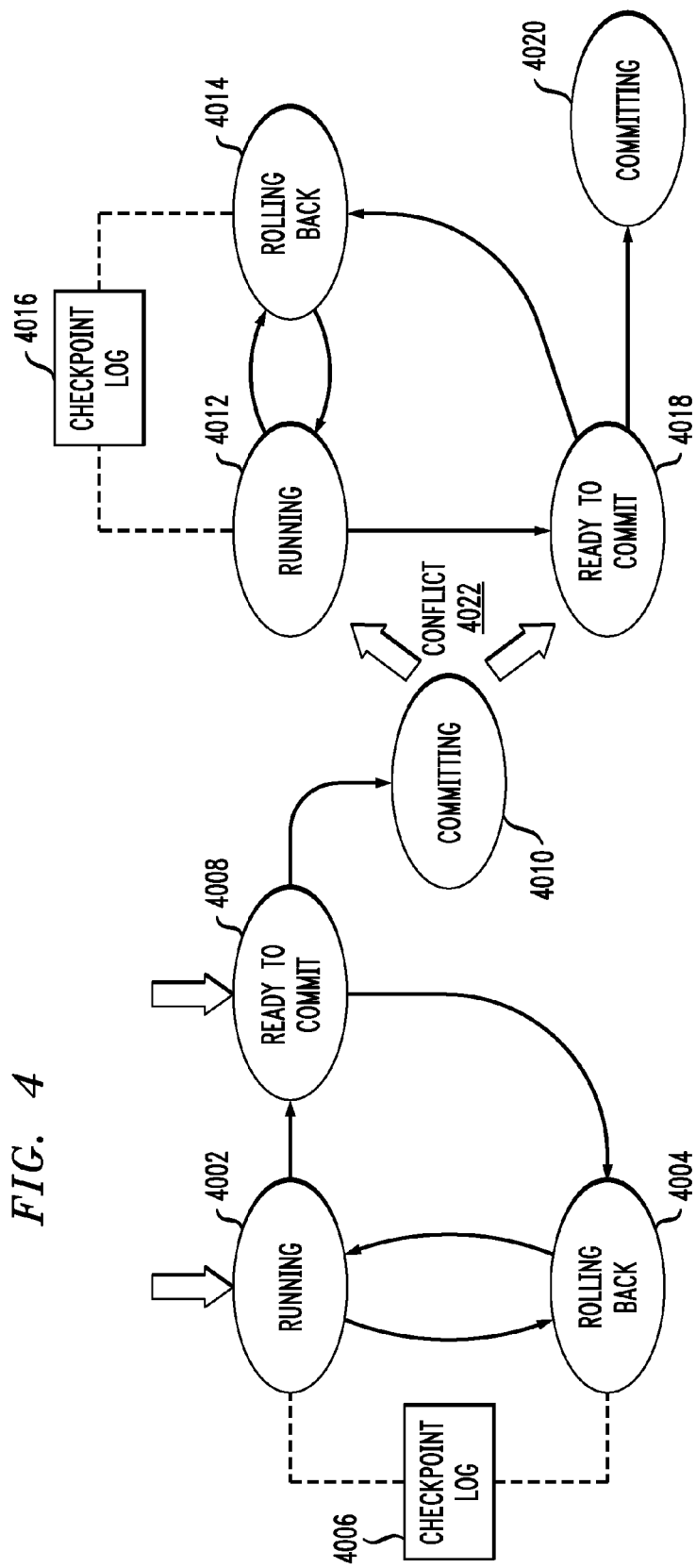
FIG. 4 depicts continuous conflict detection, according to yet another aspect of the invention.

Transaction Commit, Conflict Generation and Continuous Conflict Detection: The technique carries out a continuous conflict detection, as shown in FIG. 4, which is explained as follows.

Transaction Commit: Transactions "run" i.e. speculatively execute, as at 4002, with possible intermediate "partial-rollbacks" 4004, using their local data blocks, shared object stores and checkpoint logs 4006. Finally, some transactions succeed in reaching their "ready-to-commit" state, as per block 4008. A commit arbitrator picks up one or more such non-conflicting "ready-to-commit" transactions and brings them to the "committing" state 4010.

Conflict Generation: A "committing" transaction 4010 updates the shared objects it needs to, thus generating a new "conflict" 4022 for other concurrently executing conflicting transactions. Each conflict thus generated is recorded as a new entry in the conflict events store. Subsequently, the "committing" transaction signals the conflict to the conflicting transactions (i.e. those transactions in the updated shared object's active reader list) by turning their status flags "red," and by redirecting their conflict-pointers to the newly generated conflict event. The "committing" transaction then finally commits by removing itself from the global active transactions list.

Continuous Conflict Detection: "Running" and "ready-to-commit" transactions constantly check the color of their status flags for possible conflicts 4022, due to other already-committed transactions. While a "running" transaction may do that before every checkpoint, a "ready-to-commit" transaction does that until it is chosen by the commit arbitrator to commit itself. In case a conflict is detected (i.e. when the status flag is found red), these transactions initiate a partial rollback operation. Note that blocks 4012-4020 are analogous to blocks 4002-4010, respectively.

Commit Arbitration: Commit arbitration is required when multiple transactions are ready-to-commit; CaPRA, in one or more embodiments, provides a commit arbitration function such that two transactions can both be chosen to commit if they do not conflict with each other, or else, if they conflict, then the transaction with a smaller identifier number is chosen to commit.

Handling Partial Rollbacks: A partial rollback operation involves reading the conflict event corresponding to the "red" flag, and then using it to identify the safest checkpoint to unroll to. The safest checkpoint is the earliest transaction program location, where the transaction read any of the objects in the conflict's write-set. The transaction progressively searches through the checkpoint log entries till it finds the first log entry pertaining to any of these victim shared objects, and this entry is then considered as the safest checkpoint to unroll. Subsequently, the transaction applies the selected checkpoint's continuation, resets its entry in the global active transactions list (i.e., turns the "red" flag to "green," and nullifies the conflict pointer), decrements the number of active transactions referring to the conflict event (in the conflict event store), and then proceeds from the rolled back transaction program location.

Applying a Checkpoint Continuation: Following are the steps to apply a checkpoint continuation on the transaction's local data block: (1) For all local and/or shared objects in the transaction's local data block, the values in their undo-stacks are popped until their stack-pointers equal the corresponding stack-pointer values in the selected checkpoint's continuation. (2) Subsequently, the sync-bits of all victim shared objects are reset to "0," to indicate that these objects are now out-of-sync and hence should be re-read. (3) The value of the transaction's program counter is replaced with the corresponding value in the selected checkpoint's continuation. (4) Finally, all subsequent checkpoint log entries are truncated.

An exemplary pseudo-code listing for CaPRA is set forth in FIG. 5. A non-limiting illustrative example, in the context of linked lists, will now be provided. Consider a sorted, singly linked list 6000, as shown in FIG. 6. The numbers in the brackets denote dummy shared memory addresses. FIG. 7 presents a representative transactional version of the insert operation in the list. The startTx operation creates a new transaction with identity (ID) tx. The readTx operation takes the transaction identifier, and the address of the memory location to be read, and the writeTx operation additionally accepts the value to be written in the memory location. Consider two transactions, both trying to insert a node in the linked list shown in FIG. 6. The first transaction wants to insert a node with value 4 (hereinafter called the insert-4 transaction), while the other wants to insert a node with value 6 (hereinafter called the insert-6 transaction). Both the transactions sequentially traverse the list until they identify a suitable predecessor node for the new node, and then update the predecessor to point to the new node.

Figure 8:
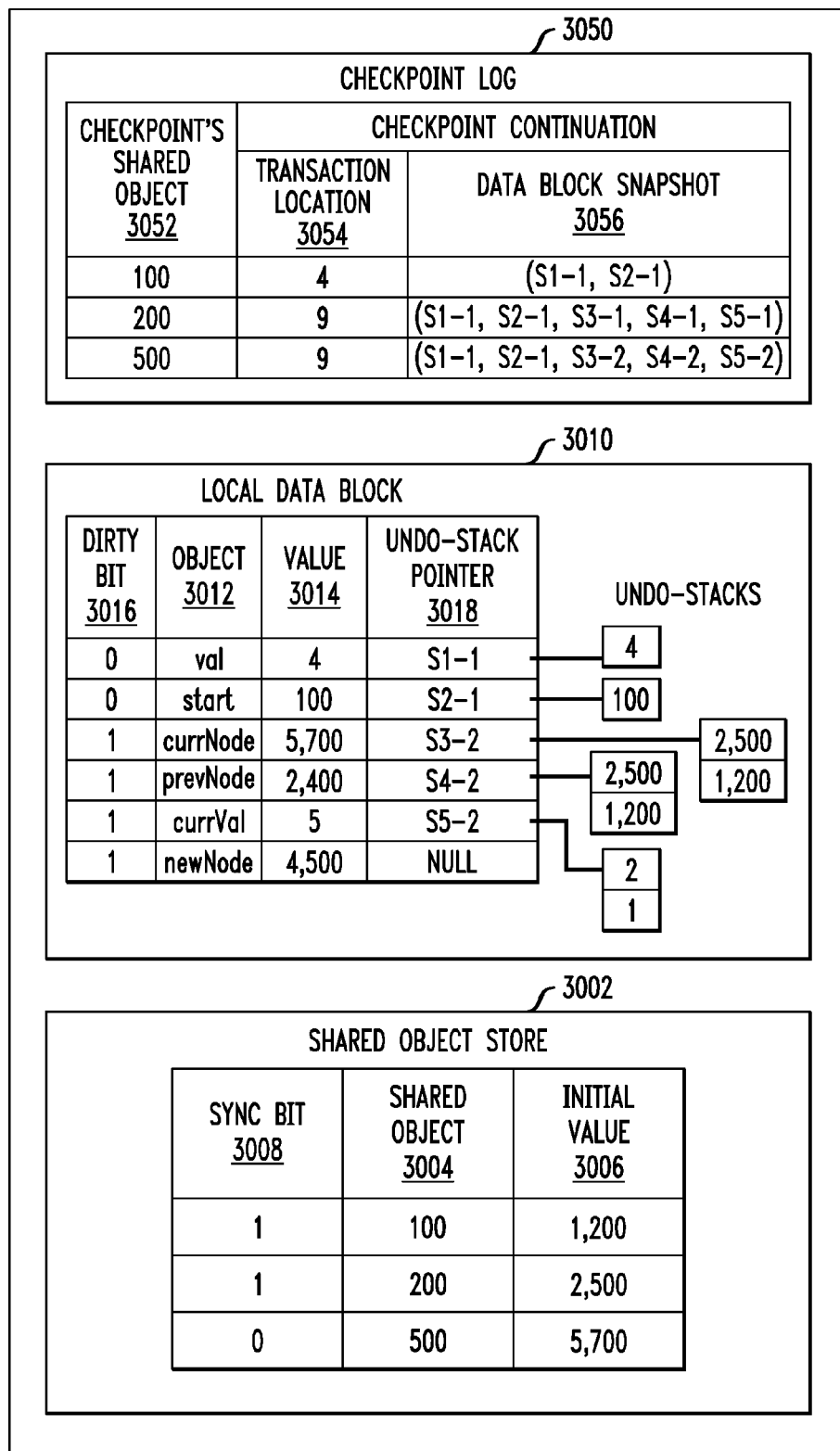
FIG. 8 shows an exemplary transaction workspace, according to a further aspect of the invention.
Figure 9:
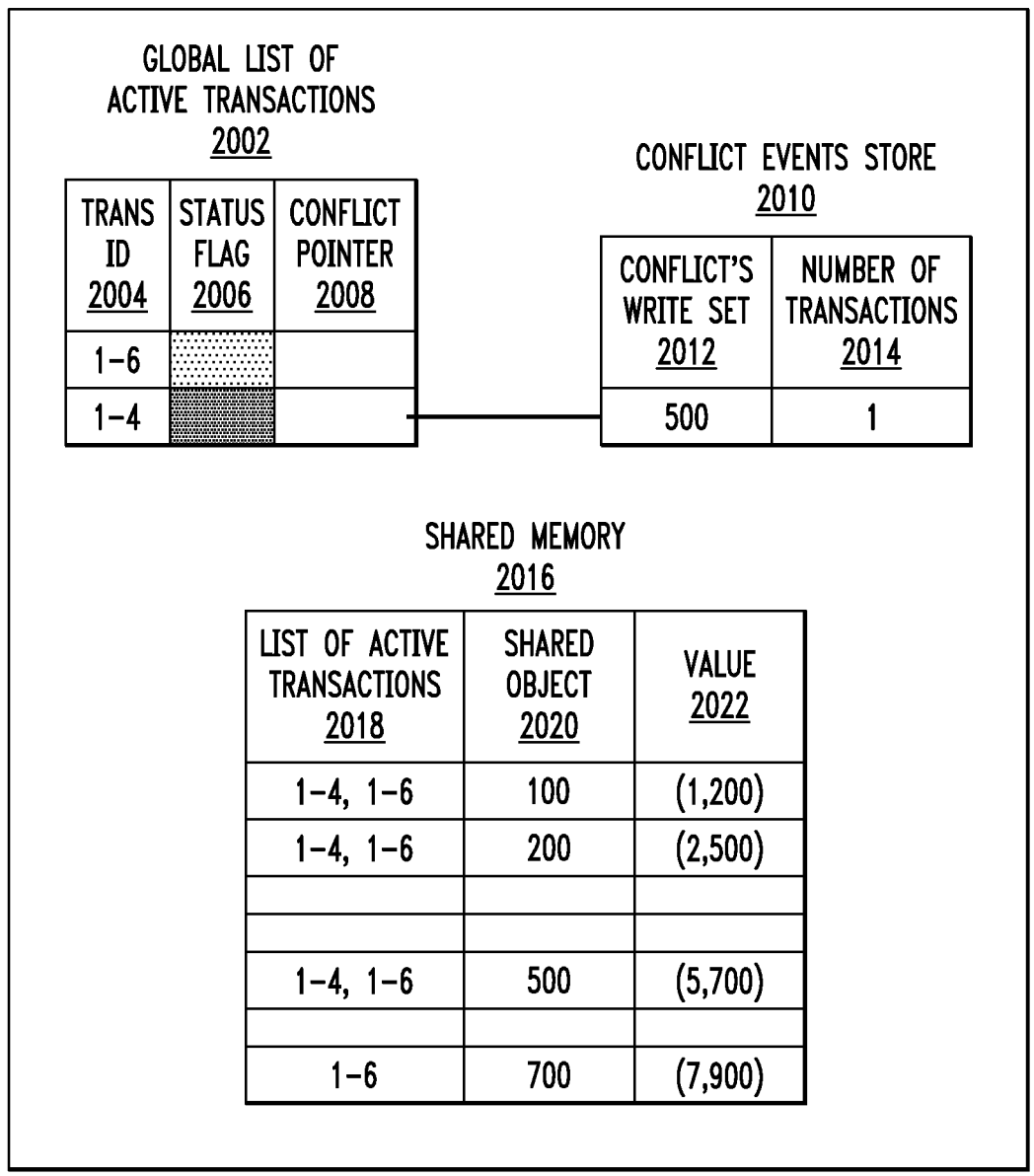
FIG. 9 depicts an exemplary workspace conflict.

The insert-4 transaction needs to update the node at location 200, whereas the insert-6 transaction needs to update the node at location 500. Since both of these transactions are reading both of these nodes, the transaction which commits first causes the other one to partially roll back. If the insert-4 transaction commits first, it causes the insert-6 transaction to rollback to the checkpoint where it first read the node at location 200; however, if the insert-6 transaction commits first, it causes the insert-4 transaction to partially rollback to the checkpoint where it first read the node at location 500. CaPRA, in one or more embodiments, suitably identifies checkpoints to rollback a transaction, and in case of a conflict, chooses a safe checkpoint to partially unroll the transaction. FIGS. 8 and 9 show the checkpoint logs and other data structures following a conflict between insert-4 (I-4) and insert-6 (I-6) transactions, in which the insert-6 transaction causes a partial rollback in the insert-4 transaction. Elements in FIG. 8 analogous to those in FIG. 3 have received the same reference character. Elements in FIG. 9 analogous to those in FIG. 2 have received the same reference character.

Proving Correctness of CaPRA

An outline of proofs for the correctness of CaPRA will now be provided.

Validity-Ensuring Conflict Function: A conflict function C is validity-ensuring if C(H,S,T)=true whenever there exists an object o, and operations r=read(o,t) in T, and w=write(o, d,s) in S, such that S ends with a commit, and $r<_H$ commit $(s)<_H$ end(t).

Lemma 1. Continuous invalidation conflict function is validity-ensuring.

Proof Immediate consequence of the definition of a validity-ensuring conflict function.

C-respecting History: A history H is said to be C-respecting, for some conflict function C, if, (1) for every pair of transactions S and T in H, if C(H,S,T)=true, then at most one of S and T succeeds; and (2) for every transaction T in H, if T ends with a commit operation, then that operation succeeds unless there exists a transaction S in H, such that C(H,S,T)=true.

Lemma 2. The histories generated by embodiments of CaPRA are C-respecting, where C is the continuous invalidation conflict function.

Proof: In embodiments of CaPRA, whenever a transaction S commits, it raises a conflict for all those transactions, which performed some read operation on the objects written by the transaction S. Formally, let $\alpha$ be the set of objects, and $\beta$ be the set of corresponding values, updated by a committed transaction S, that is, let there be operations of the form write(o,d,s) where $o \in \alpha$ and $d \in \beta$, by a committing transaction S. Now, let T be a transaction, which did some read operation on any of the objects in the set $\alpha$, that is, there were operations of the form read(o,t), and additionally read(o,t)<write(o,d,s), which indicates that C(H,S,T)=true. CaPRA in this case allows transaction S to commit, whereas T is rolled back, such that, subsequently, for all $o \in \alpha$, write(o,d,s)<read(o,t). Thus, it is proved that the histories generated by CaPRA are C-respecting, where C is the continuous invalidation conflict function.

Consistent History: If C is a validity-ensuring conflict function, and H is a C-respecting history in which every read is consistent, then H is a consistent history. Moreover, consistent histories are strictly serializable.

Lemma 3. The histories generated by CaPRA are consistent, and hence, strictly serializable.

Proof Immediate consequence of Lemma 1 and Lemma 2.

Lemma 4. CaPRA is a deadlock-free technique.

Proof CaPRA is a non-blocking technique where transactions execute in their own local space, thus avoiding deadlocks. When several of these transactions become ready-to-commit, a global transaction scheduler selects all ready-to-commit and non-interfering transactions to be simultaneously committed. Thus, since all simultaneously committing transactions are also non-interfering, there is no possibility of a deadlock.

Overheads in CaPRA

CaPRA tries to save re-reading shared memory objects in invalidated transactions by suitably checkpointing them. However, there are overheads associated with the technique itself. Assuming that space is not an issue, first categorize the time overheads involved in CaPRA and subsequently consider measures to reduce them. CaPRA in general has both time and space overheads, that is, CaPRA requires more time to do checkpointing operations as well as more space to store these checkpoint logs. Assuming that each transaction will be scheduled on a separate core on a multi-core platform, the term memory space here refers to the local cache of that core. The possible points of overhead are:

Checkpoint Log Entry Creation—The transaction walks-through the local data buffer to find dirty objects and pushes their current values on their respective undo logs. Thus, at each checkpoint, the amount of extra work to be done equals the number of push operations to be performed at each checkpoint. Subsequently, the transaction does some constant work in creating the checkpoint log, active readers list and shared object store entries.

Partial Rollback—The transaction walks-through the checkpoint object entries in the checkpoint log till it finds a conflict victim; thus the maximum amount of work to be done equals walking-through the size of the checkpoint log, which cannot be more than the number of shared objects a transaction reads and/or writes. Having selected a rollback entry, the transaction does some stack pop operations to replace the current values of objects with their correct rolled-back values, as obtained from their undo stacks. This is followed by some constant time work in resetting conflict flags and truncating checkpoint log entries.

Thus, to summarize, CaPRA's time overheads can be broadly attributed to the number of extra push operations it needs to perform at each checkpoint, plus the number of extra pop operations it needs to perform upon each conflict and rollback.

Reducing CaPRA Overheads: The space and time overheads of CaPRA are directly proportional to the number of checkpoint log entries created by a transaction, which in turn, at any point of time, is either less than or equal to the number of shared objects read and/or written by the transaction.

Reducing CaPRA Overheads—Granularity of shared memory objects: While finer granularity of shared objects means a greater number of checkpoint log entries and lesser conflicts between transactions, a coarser granularity implies a lesser number of checkpoint log entries and more conflicts. Accordingly it is believed that, in one or more embodiments, the number of checkpoint log entries (and hence CaPRA overheads) in an application should be controlled by adjusting the granularity of the shared memory objects. For example, in the linked list application discussed above, the granularity of shared objects could be as fine as each field within a link list node or as coarse as a link-list node.

Reducing CaPRA Overheads—Statically Clustering victim shared objects: In a basic embodiment of the CaPRA technique (henceforth called 1-CaPRA), each checkpoint log entry has a single victim shared object associated with it. However, two or more checkpoint log entries can be merged by including multiple victim shared objects in a single log entry (henceforth called n-CaPRA). The decision of when to merge two or more checkpoint log entries can be statically taken or dynamically taken based upon the number of local operations done between the two entries. The exemplary simulation below demonstrates that in at least some instances, statically clustering victim shared objects does actually improve the transactional speed-up.

Reducing CaPRA Overheads—Predicting the right set of shared objects: The hypothesis that, with high predictability, the set of conflicting accesses can be recorded from previous transaction executions, can, in one or more embodiments, be used to reduce CaPRA's overheads. Associate a bit field called conflicting with each shared object in the shared memory, to indicate whether or not the corresponding shared object has earlier been a victim of transactional conflicts. The technique can then, for a nonconflicting shared object, merge its checkpoint entry with the previous checkpoint, or else, if it is conflicting, can then further decide upon whether or not to create a new checkpoint entry based on the number of instructions executed after the previous checkpoint.

Non-Limiting Exemplary Simulation Results

A CaPRA simulator was implemented for an eight-core multiprocessor, each core of which runs a single thread of an application. A traditional three-level memory hierarchy including two levels of cache (L1 private data cache and L2 shared cache) and a third shared memory level was used. Three applications were used in the experiments—Skip-Lists (SL), Red-Black-Trees (RBT) and Hash-Tables (HT). Insert and delete operations on these data structures were modeled as STM transactions; each STM transaction essentially being a series of read, write and other (e.g. comparison) operations on some shared and/or local variables. The effectiveness of CaPRA was studied by varying the number of transactions and the number of shared objects used by the transactions. The experimental results were compared with the TL2 type baseline techniques, which do a lazy conflict detection followed by full transactional abort upon a conflict (referred to hereinafter as the "Abort Techniques").

Figure 10:
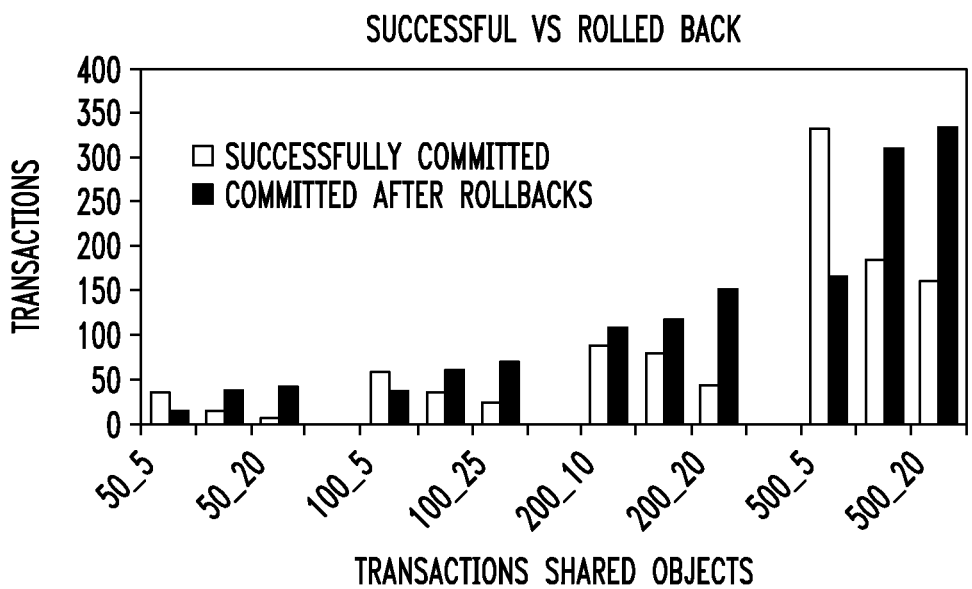
FIG. 10 shows exemplary simulation results of successfully committed transactions versus transactions that commit after one or more rollbacks.
Figure 11:
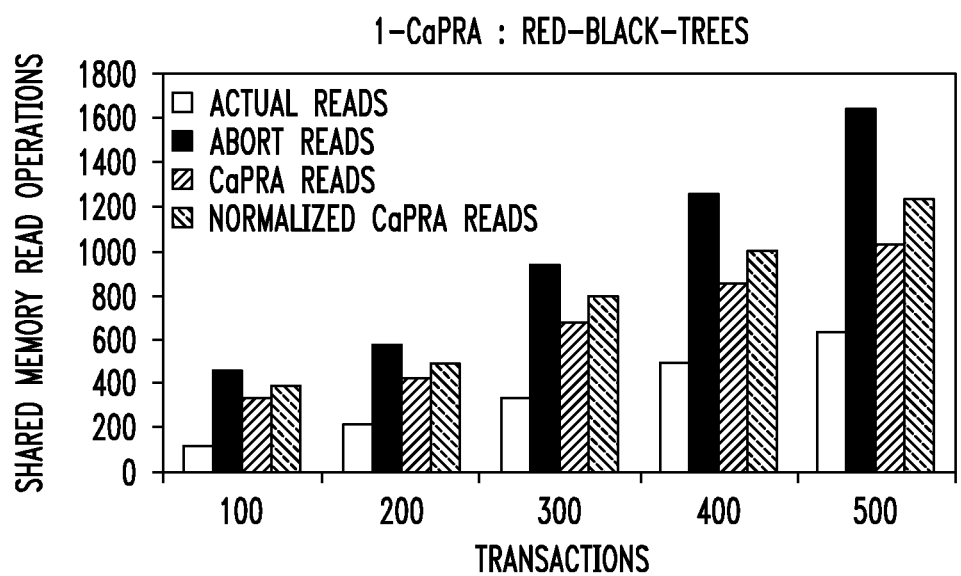
FIG. 11 compares shared memory read operations for RBT for a basic technique.
Figure 12:
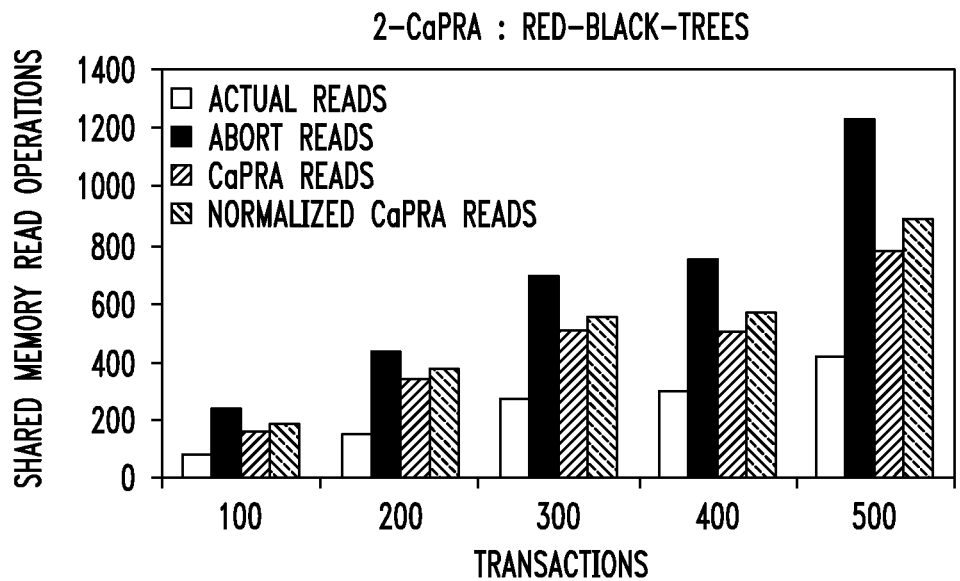
FIG. 12 compares shared memory read operations for RBT for a technique of level 2.
Figure 13:
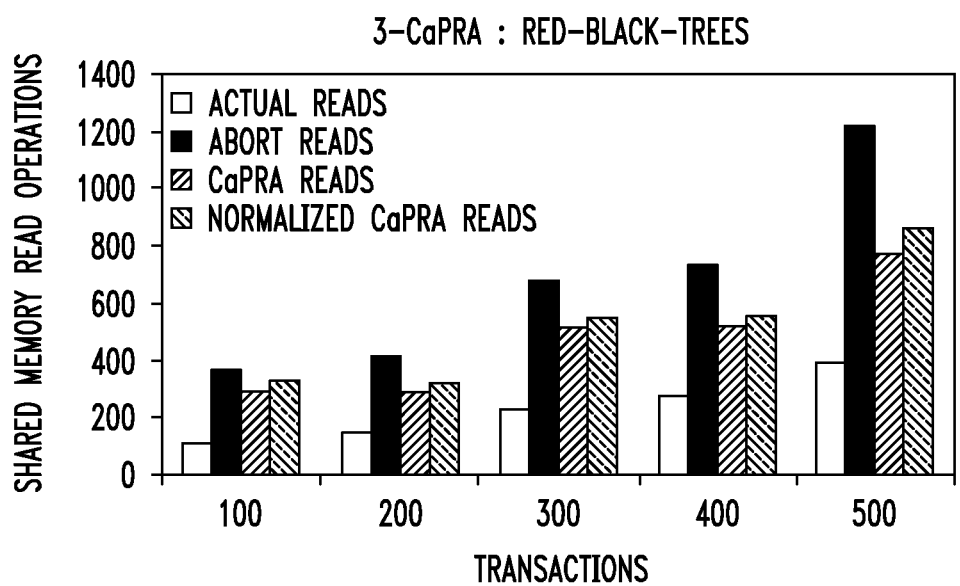
FIG. 13 compares shared memory read operations for RBT for a technique of level 3.
Figure 14:
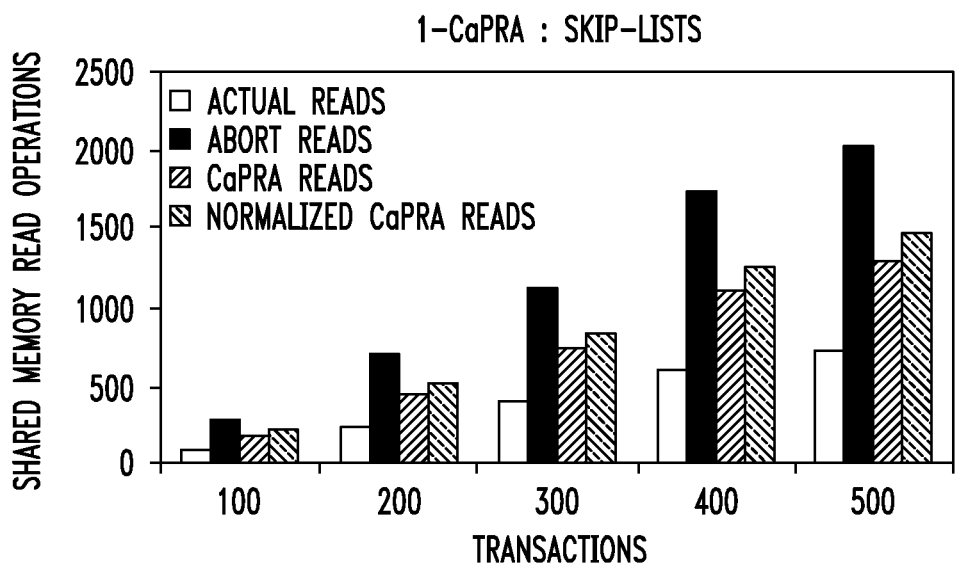
FIG. 14 compares shared memory read operations for skip lists for a basic technique.
Figure 15:
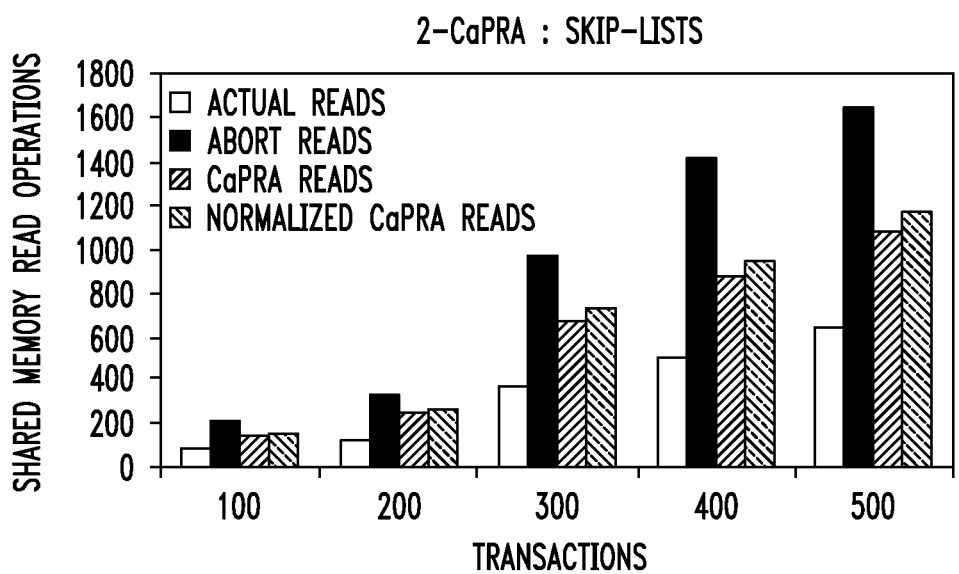
FIG. 15 compares shared memory read operations for skip lists for a technique of level 2.
Figure 16:
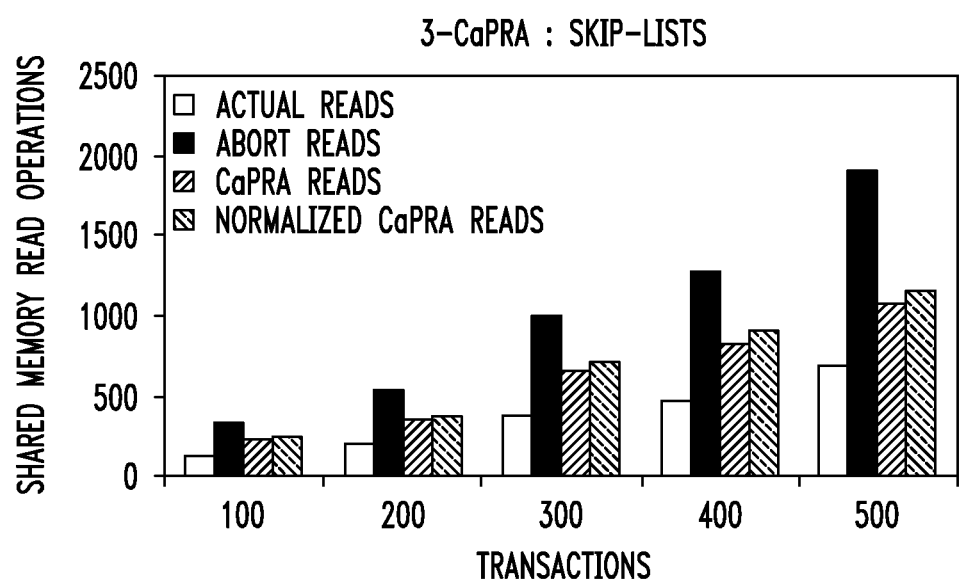
FIG. 16 compares shared memory read operations for skip lists for a technique of level 3.
Figure 17:
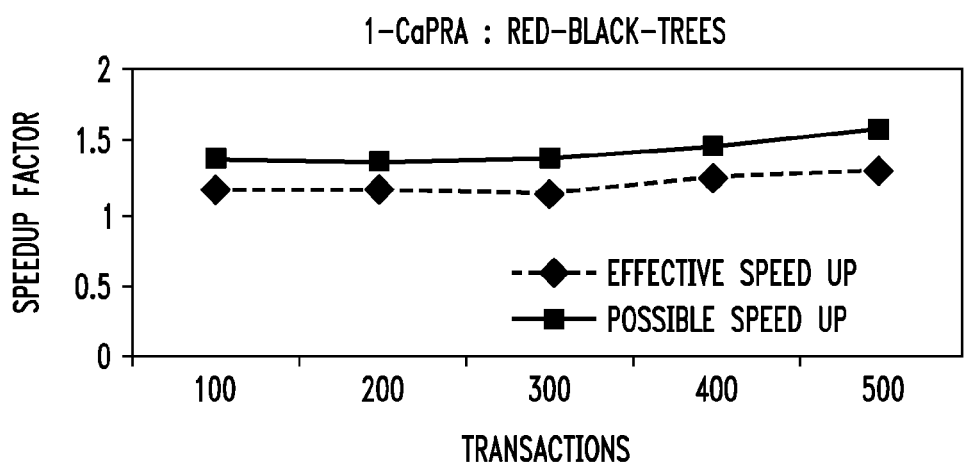
FIGS. 17-19 show the speed-up factor for red-black trees for, respectively, a basic technique, a technique of level 2, and a technique of level 3.
Figure 18:
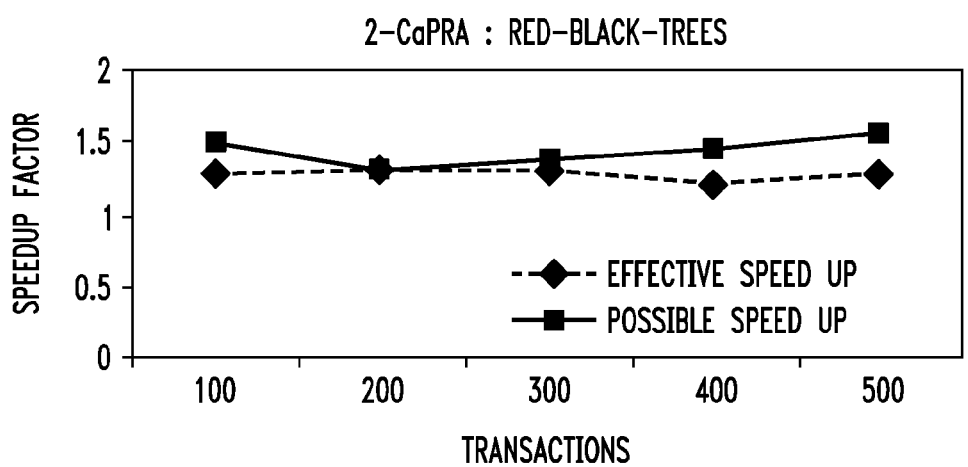
Figure 19:
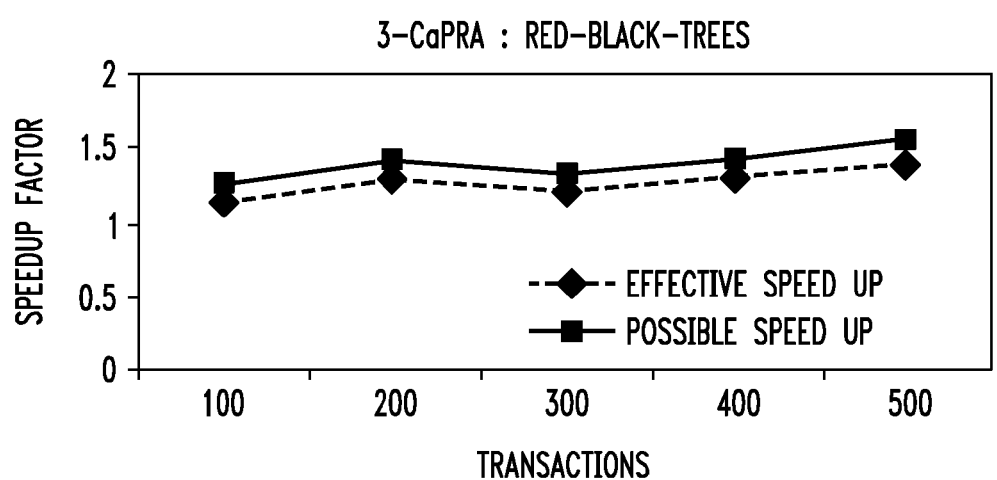
Figure 20:
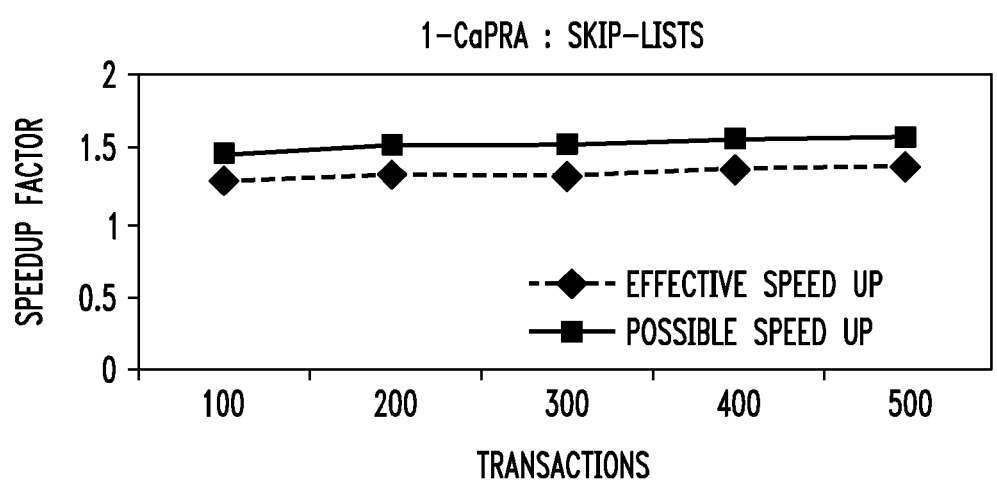
FIGS. 20-22 show the speed-up factor for skip lists for, respectively, a basic technique, a technique of level 2, and a technique of level 3.
Figure 21:
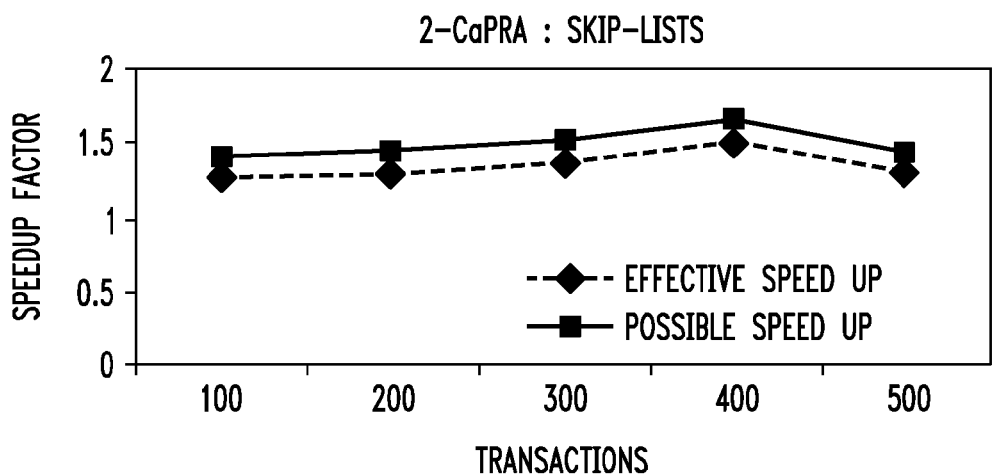
Figure 22:
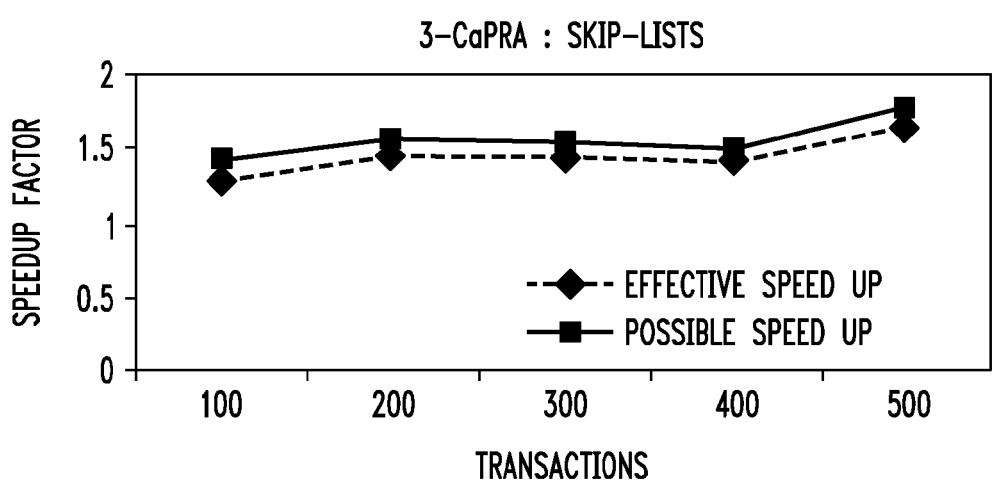

Comparing Successfully Committed vs. Rolled Back: FIG. 10 first compares the number of transactions that successfully commit without any conflicts with the number of transactions that commit after facing one or more conflicts from other transactions. A significant observation to be made here is that as the number of shared variables increase, a greater number of transactions face one or more conflicts. Therefore, any reduction in the amount of work to be redone for these conflicting transactions is not trivial.

Comparing Shared Memory Read Operations: Next, the simulation results of an embodiment of CaPRA are compared with those of the Abort Techniques. FIGS. 11-16 compare the cumulative number of shared memory read operations to be performed in both the cases (CaPRA and Abort) on the SL and RBT applications. The first bar in each set is the cumulative number (for 100, 200, . . . , 500 transactions) of shared memory read operations that had to be performed had their been no conflicts (and hence no aborts and/or rollbacks). The second bar is the cumulative number of such operations that were actually performed in the Abort Technique. The third bar is the cumulative number in case of an embodiment of CaPRA. The fourth bar depicts the normalized number for CaPRA, that is, the number obtained by adjusting CaPRA's overheads in terms of cumulative number of stack push and pop operations performed.

The results are presented for 1-CaPRA, 2-CaPRA (that is, statically, two adjacent checkpoint entries are merged into one), and 3-CaPRA.

Comparing Speed-up Factor: FIGS. 17-22 show the speedup factors obtained in the various cases. Compute the speed-up factor for the above experiments as follows:

$$\text{Speedup} = \left(\sum_{i=1}^{num-txns} n_{i-abort}\right) / \left(\sum_{i=1}^{num-txns} n_{i-normCapra}\right) \quad (1)$$

where num-txns is the total number of transactions in the experiment, $n_{i-abort}$ is the number of shared memory read operations performed for transaction i by the Abort Technique, $n_{i-normCapra}$ is the corresponding number for the normalized CaPRA technique.

FIGS. 23 and 24 compare the speedup factors achieved by 1-CaPRA, 2-CaPRA and 3-CaPRA for the two applications.

Following are some observations and/or inferences that can be drawn from the experimental results, it being understood that other embodiments of the invention may differ:
(1) In any transactional run, the number of transactions that face a conflict with other transactions is not trivial.
(2) Further, the number of transactions that face at least one conflict increases with an increase in the number of shared variables they operate on.
(3) For RBT applications, an 18% speedup was measured for conflicting transactions, when using 1-CaPRA, which increased to 23%, when using 3-CaPRA. The same in the case of SL application were 25% and 30% respectively.
(4) In moving from 1-CaPRA to 3-CaPRA, stack push and pop overheads are reduced, and hence there is a gain in speedup.
(5) Checkpointing a transaction saves a good amount of work that had to be re-done otherwise, in case of a conflict.
(6) One or more embodiments of the CaPRA technique deliver speedups for conflicting transactions, whenever they are lengthy, or share a good number of objects amongst themselves.

The Hash Table Application: The CaPRA technique was employed on the Hash-Table (HT) application as well. The table of FIG. 25 compares the sizes of the transactions and the number of checkpoints generated for the three applications (RBT, SL and HT) used in the simulation experiments. From the table it follows that:
The number of operations and checkpoints in the HT transactions were considerably less as compared to those in the RBT or SL transactions.
Partially rolling back an HT transaction almost always brought it to the first checkpoint, which was equivalent to aborting and restarting it. As a result, no particular benefits were obtained in this case; on the contrary, the logging of checkpoints impacted negatively on its speedup factor.

Extended Automatic Checkpointing and Partial Rollback Technique for STM

CaPRA tries to save re-reading shared memory objects in invalidated transactions by suitably checkpointing them. However, there are overheads associated with the technique itself. As noted above, there is a need to reduce overheads in general for smaller-size transactions or when transactions do not conflict much with each other. Statically clustering n checkpoints (n-CaPRA) does not guarantee speed-up in such cases (e.g. the Hash Table application presented above).

One or more embodiments make use of one or both of the following two techniques for doing intelligent clustering, namely, Dynamic Clustering and Probabilistic Clustering. While dynamic clustering reduces overheads when transactions are small, probabilistic clustering helps when transactions do not conflict much with each other.

Intelligent Clustering

Dynamic Clustering: Checkpointing small-size transactions results in more overheads since not much is saved, even after a conflict. For such transactions, dynamic clustering delays checkpoint creation till some good number of operations can be saved by creating a new checkpoint. Dynamic Clustering delays creation of a new checkpoint until some threshold number of operations have been performed between the current and the previous checkpoint.

The optimal value of the minimum number of operations between two checkpoints can be derived based on the amount of overheads involved in creating a new checkpoint. Transactions create a first checkpoint in the beginning, and cluster subsequent shared object reads with this checkpoint until some minimum number of operations have been performed (in which case they create a new checkpoint). Thus, for smaller sized transactions, this would result in no, or negligible, checkpointing and hence negligible checkpointing overheads. For example, insert and delete transactions of hash table application have just 15-25 operations as compared to the SL or RBT transactions which have between 65-80 operations; dynamic clustering would prevent creation of checkpoints in hash table transactions, thus reducing overheads.

Probabilistic Clustering: Lengthy transactions that do not have many conflicts with each other still need to bear the overheads of checkpointing. Probabilistic clustering is a technique to overcome such overheads. Probabilistic clustering ensures that when transactions do not conflict, they do not create unnecessary checkpoints, and thus overcome overheads. Probabilistic clustering associates a conflict probability value with each shared object, which increases as and when the shared object is involved in a conflict, and is reset to zero when no transactions are reading it. Transactions create new checkpoints for only those shared objects which have a good probability of ending up in a conflict, otherwise the new checkpoint is clustered with the previous checkpoint, thus reducing overheads.

Two techniques for probabilistic clustering include: Binary Probabilistic Clustering and Generalized Probabilistic Clustering.

Binary Probabilistic Clustering: Initially the conflict probability of all the shared objects is 0. The conflict probability for a shared object o is set to 1 when one or more transactions face a conflict resulting from an update of the shared object o by some committing transaction. Let n be the maximum number of operations any transaction rolled back because of a conflict on the shared object o. Then the conflict probability of the shared object o continues to be 1 till at least n more operations are performed, beyond which it can be reset to 0 if no more transactions are reading it. An executing transaction creates a checkpoint for a shared object o only if the conflict probability value of the shared object o is 1.

Generalized Probabilistic Clustering: Initially, when there are no transactions, the conflict probability of all the shared objects is 0. As multiple transactions access a shared object o, its conflict probability gets updated as follows. Define the following:
- k: Total number of transactions accessing the shared object o.
- n: Total number of transactions that will update the shared object o (the possible write set of a transaction can be identified by a simple static pass through the transaction) and thus will generate conflicts with other concurrently accessing transactions.

The conflict probability for the shared object o is then set to n/k, whenever k>1.

An executing transaction creates a checkpoint for a shared object o only if the conflict probability value of the shared object o is greater than some threshold value. Multiple heuristics can further be used to ensure creation of only useful checkpoints; some of them are:
- If the highest conflict probability value for any shared object in the previous checkpoint is greater than the conflict probability value of the new shared object being considered for taking a checkpoint, then it is better to cluster the new checkpoint with the previous checkpoint itself.
- If the transaction has not performed some minimum number of operations beyond the last checkpoint, then it does not make much sense to create a new checkpoint even though the conflict probability value is high. In this case, clustering the new checkpoint with the previous one is a better idea.

Review

In review, embodiments of the invention provide a novel partial rollback STM technique, CaPRA, for automatically checkpointing and partially rolling back transactions. In any transactional run, the number of transactions that face a conflict with other transactions is not trivial. Further, the number of transactions that face at least one conflict increases with an increase in the number of shared variables they operate on. Checkpointing a transaction saves a good amount of work that had to be re-done otherwise, in case of a conflict. Simulation results establish that one or more embodiments of the n-CaPRA technique deliver speedups for conflicting transactions, when, for example, they are lengthy, or share a good number of objects amongst themselves. Further, such simulation results also appear to indicate that some embodiments of CaPRA can deliver a speedup of 18% to 30% for conflicting transactions. Intelligent clustering of checkpoints helps further reduce CaPRA overheads and makes it prone to cases when transactions are small-size and/or do not conflict much with each other. Note that other embodiments may possibly achieve better, worse, or similar results.

One or more embodiments of the invention thus provide a concurrency control paradigm that provides atomic and isolated execution for regions of code. At least some instances of the invention are applicable to programming multicore processors. A transaction is a finite sequence of memory reads and writes executed by a single thread, "atomically." Advantageously, in one or more embodiments, programmers only need to reason locally about shared data accesses, mark the code region to be executed transactionally, and let the underlying TM system ensure the correct concurrent execution. It should be noted that in many cases, the overhead of transactional reads dominates all others because of the frequency of read operations relative to all other operations; one or more embodiments of the invention are able to address this issue.

One or more embodiments of the invention advantageously provide automatic transaction checkpointing, wherein checkpoints are automatically detected and created as transactions proceed in their workspace. Furthermore, in at least some instances of the invention, continuous conflict detection is implemented, wherein conflicts are generated as transactions commit and then signaled to other concurrently executing conflicting transactions (that is, conflicts are detected as and when they happen). One or more embodiments allow transactions to partially roll back their operations (to the checkpoint) based on continuous conflict detection, lazy versioning and automatic transaction checkpointing (detection and creation of checkpoints automatically). Partial rollbacks may be based on an integration of automatic checkpointing and continuous conflict detection leading to enhanced performance realization of STMs. In at least some instances, intelligent clustering is undertaken (Static, Dynamic and/or Probabilistic) of checkpoints to reduce the overheads for small size transactions or to improve performance when transactions do not conflict much with each other. In one or more embodiments, the deadlock-free CaPRA solution can be adapted for guaranteeing progress and starvation-freedom using concurrent programming techniques.

Figure 26:
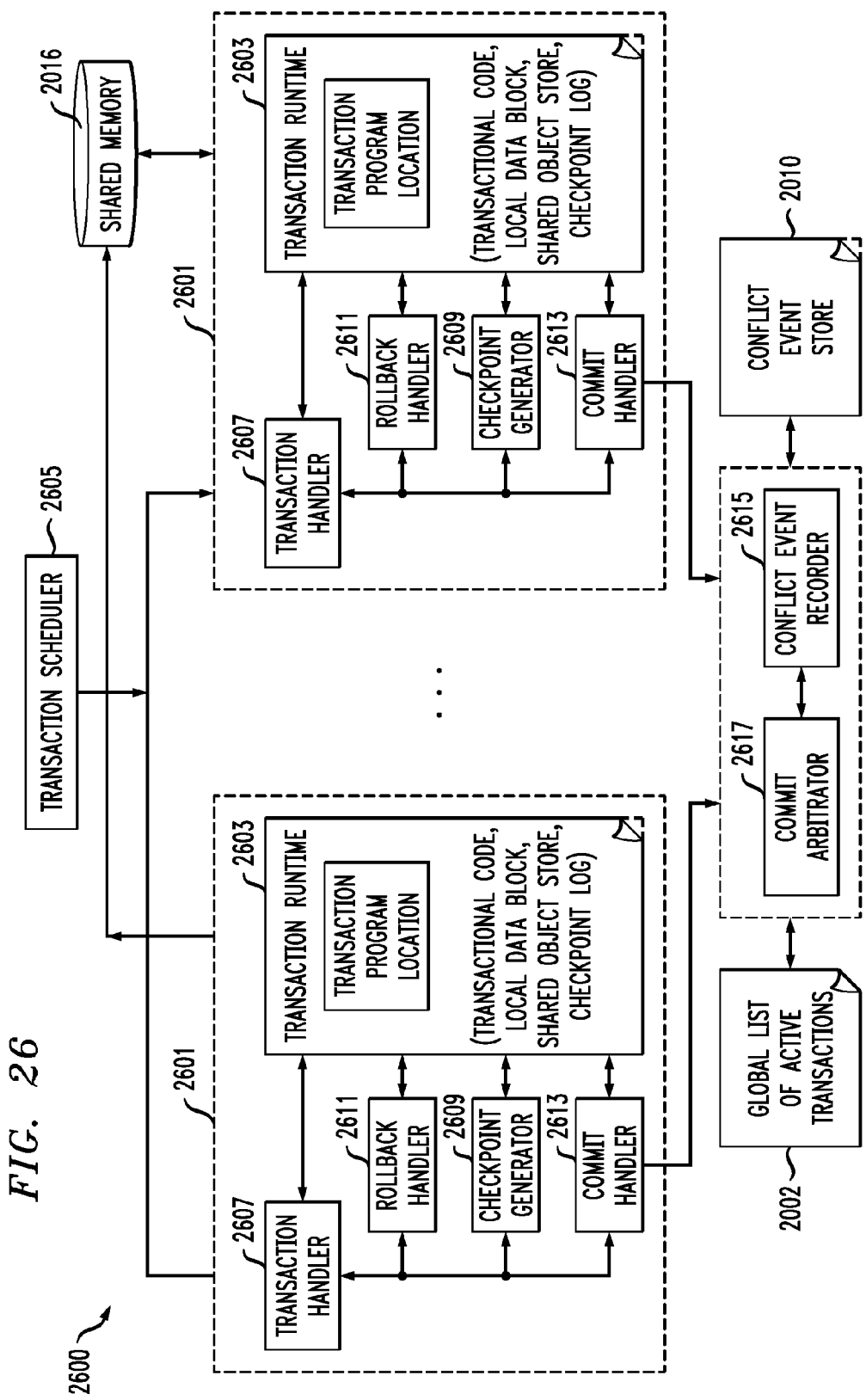
FIG. 26 is a system block diagram depicting exemplary software architecture.

FIG. 26 is a system block diagram of an exemplary system 2600, according to an aspect of the invention. Note the global list of active transactions 2002, conflict event store 2010, and shared memory 2016 as described above. The remainder of the elements will be described in connection with the steps depicted in FIG. 27.

Figure 27:
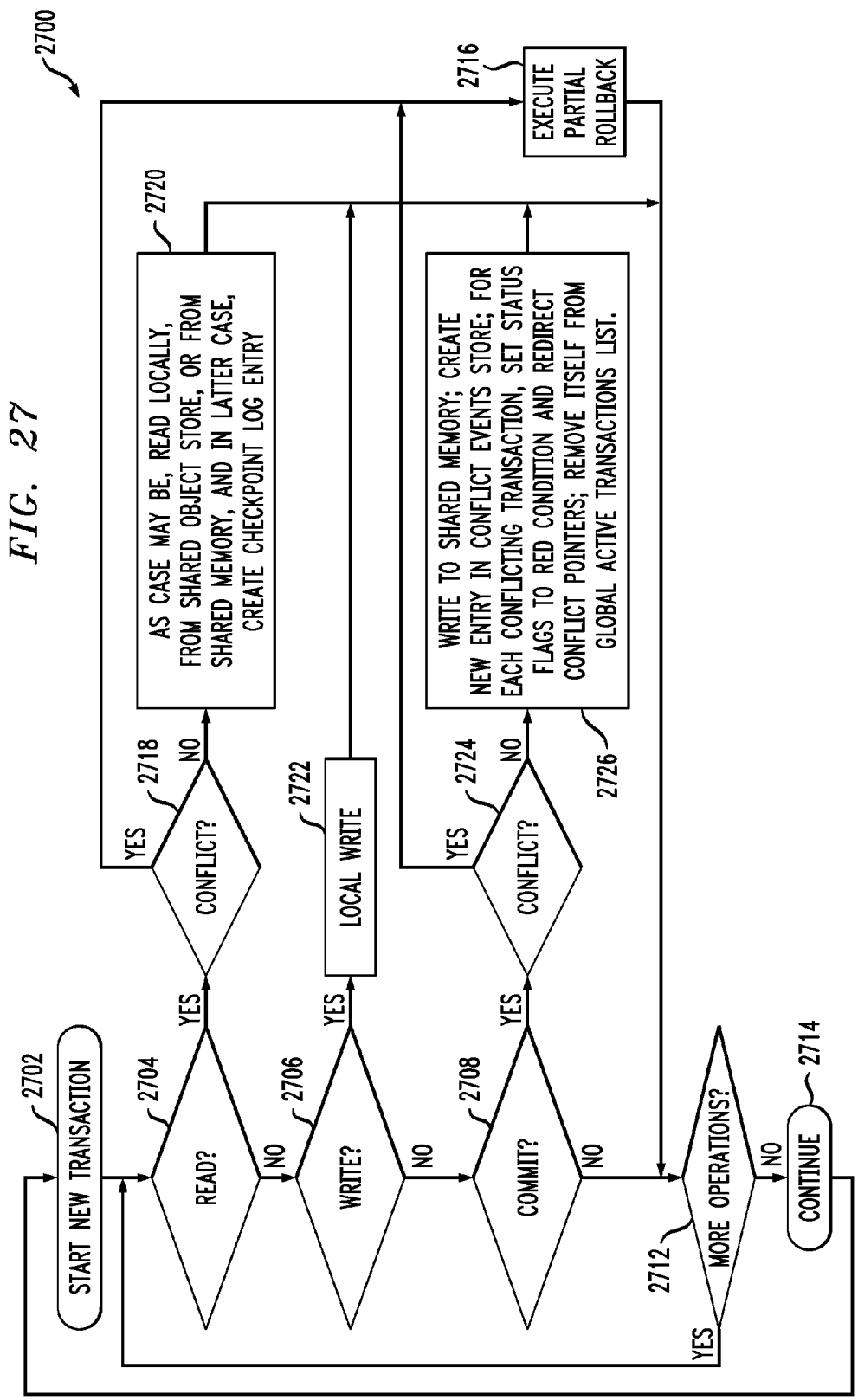
FIG. 27 is a flow chart of exemplary method steps, according to a still further aspect of the invention.

Continuing to refer to FIG. 26, reference should now also be had to FIG. 27, which presents a flow chart 2700 of an exemplary method, according to an aspect of the invention. Processing for a new transaction begins at 2702. In the method, while speculatively executing a given one of a plurality of transactions concurrently executing on a computer, carry out write operations in a local data block 3010, as shown at 2706 and 2722. The plurality of transactions 2601 may each have a transaction runtime 2603 including the corresponding transactional code, local data block 3010, shared object store 3002, and checkpoint log 3050. The transactions 2601 may each be scheduled by a transaction scheduler 2605, and each may have its own transaction handler 2607. The write operation may be carried out, for example, with the aid of the corresponding transaction handler 2607.

Furthermore, during the speculative execution, automatically create an entry in a checkpoint log 3050 when reading from a shared memory 2016, as shown at 2704, 2718, and 2720, to be discussed in greater detail below. The entry may be created by checkpoint generator 2609. In addition, during the speculative execution, continuously conflict check during read and tentative commit operations, as shown at 2718, 2724, and carry out a partial rollback at 2716, using rollback handler 2611, upon detection of a conflict in the conflict checking step. The partial rollback is based upon the checkpoint log 3050. The conflict check for the read may be implemented, for example, using the corresponding transaction handler 2607. The conflict check for the tentative commit may be implemented, for example, using the corresponding commit handler 2613.

In one or more embodiments, in decision block 2704, determine if a READ operation is to be carried out. If so, as per the Y branch, determine, in decision block 2718, whether a conflict is detected. If a conflict is detected, execute a partial rollback at 2716, using rollback handler 2611. If no conflict is detected, as per 2720, read locally, if data to be read is in the local data block 3010; if the data to be read is not in the local data block, read from the shared object store 3002 if the data to be read is in the shared object store and is in sync with the shared memory; and otherwise, read the data to be read from the shared memory 2016 and automatically create the entry in the checkpoint log 3050 using checkpoint generator 2609. If no read is to be carried out, as per the N branch of decision block 2704, check whether other actions are to be performed, that is, write or commit.

In case a write operation is to be performed, as per the Y branch of block 2706, the same is carried out locally as indicated at 2722.

With reference to decision block 2708, a determination is made whether it is appropriate for the transaction to attempt to commit. If so, as per the Y branch, perform a conflict check in block 2724, using commit handler 2613. This process is referred to herein, including the claims, as a "tentative" commit. If no conflict is detected, as per the N branch of decision block 2724, in step 2726, write appropriate shared objects to the shared memory 2016, create a new entry in the conflict events store 2010 using conflict event recorder 2615, and, subsequent to writing the appropriate shared memory objects, for each transaction in the active reader list 2018 of the updated shared object 2020, set status flags 2006 to the red condition and redirect conflict pointers 2008 to the new entry in the conflict events store 2010. Finally, remove the given transaction from the global active transactions list 2002. If a conflict was detected in block 2724, execute the partial rollback in step 2716.

Commit arbitrator 2617 carries out commit arbitration as described above.

In one or more embodiments, partial rollback step 2716 includes identifying, in the checkpoint log 3050, the safest checkpoint to roll back to. This can be done by searching the checkpoint log to locate the first log entry pertaining to a pertinent victim shared object in the corresponding conflict's write set 2012, and taking the same as the safest checkpoint. Step 2716 also includes applying a continuation (as defined above) of the safest checkpoint, resetting the status flag 2006 of the given one of the transactions to the green condition, and proceeding with the speculative execution at a rolled back transaction program location.

In one or more embodiments, dynamic clustering can be carried out as described above. In such cases, the automatic creation of a new entry in the checkpoint log 3050, as in block 2720, is delayed until a predetermined number of operations can be saved by checkpoint creation. Transactions are classified as small or large depending upon the number of operations they have. The threshold for dynamic clustering is based on the number of extra operations to be performed if a new checkpoint entry is to be created; it should be canonically obtained by experimentation on similar applications.

In one or more embodiments, probabilistic clustering can be carried out as described above. In such cases, the automatic creation of a new entry in the checkpoint log 3050, as in block 2720, is not carried out when a conflict probability with a given shared object is less than a threshold value. Transactions are classified as small or large depending upon the number of operations they have. The threshold for probabilistic clustering is based on the number of extra operations to be performed if a new checkpoint entry is to be created vs. transaction operations saved if transaction is rolled back to this checkpoint; it should be canonically obtained by experimentation on similar applications.

In decision block 2712, determine if there are more operations remaining in the transaction, in which case processing flows back to prior to step 2704 as per the Y branch; otherwise, follow the N branch to CONTINUE block 2714.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 28:
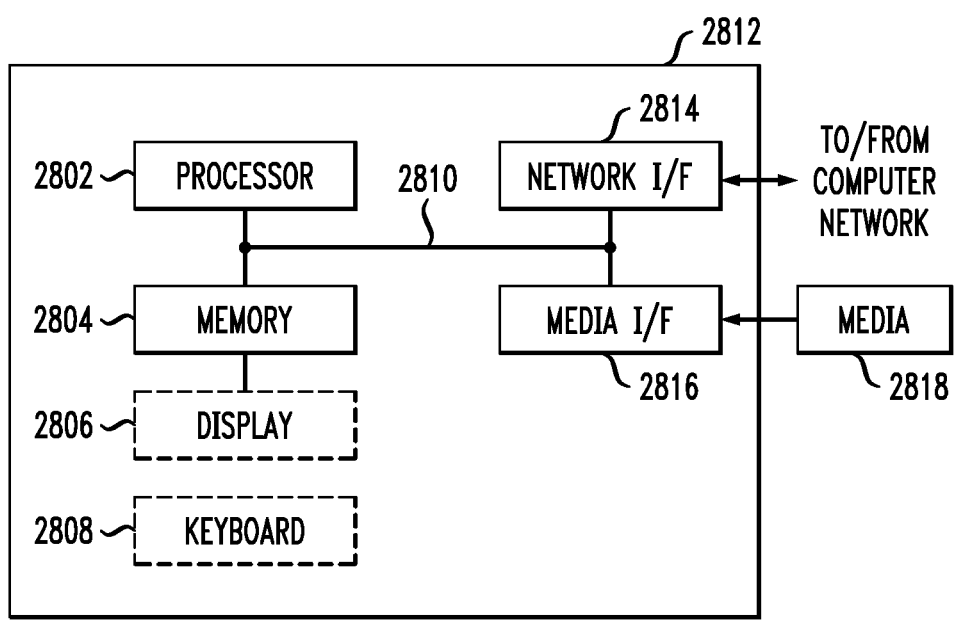
FIG. 28 depicts a computer system that may be useful in implementing one or more aspects and/or elements of the invention.

One or more embodiments can make use of software running on a general purpose computer or workstation. With reference to FIG. 28, such an implementation might employ, for example, a processor 2802, a memory 2804, and an input/output interface formed, for example, by a display 2806 and a keyboard 2808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 2802, memory 2804, and input/output interface such as display 2806 and keyboard 2808 can be interconnected, for example, via bus 2810 as part of a data processing unit 2812. Suitable interconnections, for example via bus 2810, can also be provided to a network interface 2814, such as a network card, which can be provided to interface with a computer network, and to a media interface 2816, such as a diskette or CD-ROM drive, which can be provided to interface with media 2818.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 2802 coupled directly or indirectly to memory elements 2804 through a system bus 2810. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 2808, displays 2806, pointing devices, and the like) can be coupled to the system either directly (such as via bus 2810) or through intervening I/O controllers (omitted for clarity).

Network adapters such as network interface 2814 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 2812 as shown in FIG. 28) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 2818 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Note that one or more embodiments are applicable to concurrent computing and may involve the use of multiple computing nodes, each with one or more processors; furthermore, the local software blocks shown in FIG. 26 will typically be implemented on the processor carrying out the given transaction.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 26. The method steps can then be carried out using the distinct software modules and/or sub-modules of the system, as described above, executing on one or more hardware processors 2802. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
while speculatively executing a given one of a plurality of transactions concurrently executing on a computer, wherein the plurality of transactions share multiple objects:
carrying out write operations for the given transaction in a local data block of the given transaction;
automatically creating an entry in a checkpoint log at a given time stamp upon a determination that a conflict probability with a given shared object is greater than a threshold value, and cancelling an automatic creation of the entry in the checkpoint log upon a determination that the conflict probability with the given shared object is less than the threshold value, wherein said automatically creating the entry comprises:
determining whether the given one of the multiple shared objects exists in the local data block of the given transaction at the given time stamp;
reading the value of the given shared object from a shared memory associated with the plurality of transactions if the given shared object does not exist in the local data block of the given transaction at the given time stamp;
writing the value of the given shared object at the local data block of the given transaction at the given time stamp; and
creating the entry in the checkpoint log to identify (i) the given shared object and (ii) the local data block of the given transaction at the given time stamp;
continuously conflict checking during read and tentative commit operations;
upon a determination that no conflict is detected in the read operation:

reading locally if data to be read is in the local data block, if the data to be read is not in the local data block, reading from a shared object store if the data to be read is in the shared object store and is in sync with the shared memory; and otherwise reading the data to be read from the shared memory;

upon a determination that no conflict is detected in the tentative commit operation:

writing appropriate shared objects to the shared memory to obtain updated shared objects;

creating a new entry in a conflict events store;

subsequent to the writing of the appropriate shared objects, for each transaction in an active reader list of the updated shared objects, setting status flags to a red condition and redirecting conflict pointers to the new entry in the conflict events store; and removing the given one of the transactions from a global active transactions list;

carrying out a partial rollback upon detection of a conflict event in the conflict checking step, the partial rollback being based upon the checkpoint log, wherein carrying out a partial rollback comprises:

identifying, in the checkpoint log, a safest checkpoint to roll back to wherein the safest checkpoint is an earliest log entry pertaining to a given one of the multiple shared objects in a write set of the conflict event;

applying a continuation of the safest checkpoint;

resetting a status flag of the given one of the transactions to a green condition; and proceeding with speculatively executing the given one of a plurality of transactions concurrently executing on a computer from the safest checkpoint.

2. The method of claim 1, wherein carrying out the partial rollback comprises:

applying a continuation of the safest checkpoint;

resetting a status flag of the given one of the transactions to a green condition; and proceeding with the speculative execution at a rolled back transaction program location.

3. The method of claim 2, wherein the safest checkpoint is identified by searching the checkpoint log to locate a first log entry pertaining to a pertinent one of the multiple shared objects in a write set of the conflict, and taking the first log entry pertaining to the pertinent one of the multiple shared objects as the safest checkpoint to roll back to.

4. The method of claim 1, further comprising, in the tentative commit operation, if no conflict is detected:

writing appropriate shared objects to the shared memory to obtain updated shared objects;

creating a new entry in a conflict events store;

subsequent to the writing of the appropriate shared objects, for each transaction in an active reader list of the updated shared objects, setting status flags to a red condition and redirecting conflict pointers to the new entry in the conflict events store; and removing the given one of the transactions from a global active transactions list.

5. The method of claim 1, wherein the automatic creation of the entry in the checkpoint log is delayed until a predetermined number of operations can be saved by checkpoint creation.

6. The method of claim 1, further comprising providing a system, wherein the system comprises distinct software modules, each of the distinct software modules being embodied on a tangible computer-readable recordable storage medium, and wherein the distinct software modules comprise a transaction handler module, a rollback handler module, a checkpoint generator module, and a commit handler module;

wherein:

the carrying out of the write operations is implemented by the transaction handler module executing on at least one hardware processor;

the creation of the entry in the check point log is implemented by the checkpoint generator module executing on the at least one hardware processor;

the conflict checking during the read operation is implemented by the transaction handler module executing on the at least one hardware processor;

the conflict checking during the tentative commit operation is implemented by the commit handler module executing on the at least one hardware processor;

the partial rollback is implemented by the rollback handler module executing on the at least one hardware processor.

7. A computer program product comprising a non-transitory computer readable storage medium having computer readable program code embodied therewith, the computer readable program code comprising:

computer readable program code configured to carry out write operations, for a given one of a plurality of transactions concurrently executing on a computer, in a local data block of the given transaction, while speculatively executing the given one of the plurality of transactions concurrently executing on the computer, wherein the plurality of transactions share multiple objects;

computer readable program code configured to automatically create an entry in a checkpoint log at a given time stamp upon a determination that a conflict probability with a given shared object is greater than a threshold value, and cancelling an automatic creation of the entry in the checkpoint log upon a determination that the conflict probability with the given shared object is less than the threshold value, while speculatively executing the given one of the plurality of transactions concurrently executing on the computer, wherein said automatically creating the entry comprises:

determining whether the given one of the multiple shared objects exists in the local data block of the given transaction at the given time stamp;

reading the value of the given shared object from a shared memory associated with the plurality of transactions if the given shared object does not exist in the local data block of the given transaction at the given time stamp;

writing the value of the given shared object at the local data block of the given transaction at the given time stamp; and creating the entry in the checkpoint log to identify (i) the given shared object and (ii) the local data block of the given transaction at the given time stamp;

computer readable program code configured to continuously conflict check during read and tentative commit operations;

computer readable program code configured to, upon a determination that no conflict is detected in the read operation:

read locally if data to be read is in the local data block;

if the data to be read is not in the local data block, read from a shared object store if the data to be read is in the shared object store and is in sync with the shared memory; and otherwise read the data to be read from the shared memory;

computer readable program code to, upon a determination that no conflict is detected in the tentative commit operation:

write appropriate shared objects to the shared memory to obtain updated shared objects;

create a new entry in a conflict events store;

subsequent to the writing of the appropriate shared objects, for each transaction in an active reader list of the updated shared objects, set status flags to a red condition and redirect conflict pointers to the new entry in the conflict events store; and remove the given one of the transactions from a global active transactions list;

computer readable program code configured to carry out a partial rollback upon detection of a conflict in the conflict checking step, while speculatively executing the given one of the plurality of transactions concurrently executing on the computer, the partial rollback being based upon the checkpoint log., wherein carrying out a partial roll back comprises:

identifying, in the checkpoint log, a safest checkpoint to roll back to wherein the safest checkpoint is an earliest log entry pertaining to a given one of the multiple shared objects in a write set of the conflict event;

applying a continuation of the safest checkpoint;

resetting a status flag of the given one of the transactions to a green condition; and proceeding with speculatively executing the given one of a plurality of transactions concurrently executing on a computer from the safest checkpoint.

8. The computer program product of claim 7, wherein carrying out the partial rollback is implemented by:

computer readable program code configured to apply a continuation of the safest checkpoint;

computer readable program code configured to reset a status flag of the given one of the transactions to a green condition; and computer readable program code configured to proceed with the speculative execution at a rolled back transaction program location.

9. The computer program product of claim 8, wherein the safest checkpoint is identified by computer readable program code configured to search the checkpoint log to locate a first log entry pertaining to a pertinent one of the multiple shared objects in a write set of the conflict, and computer readable program code configured to take the first log entry pertaining to the pertinent one of the multiple shared objects as the safest checkpoint to roll back to.

10. The computer program product of claim 7, further comprising distinct software modules, each of the distinct software modules being embodied on the computer-readable storage medium, the distinct software modules comprising a transaction handler module, a rollback handler module, a checkpoint generator module, and a commit handler module;

wherein:

the transaction handler module comprises the computer readable program code configured to continuously conflict check during the read operations; and the checkpoint generator module comprises the computer readable program code configured to automatically create the entry in the checkpoint log;

the commit handler module comprises the computer readable program code configured to continuously conflict check during the tentative commit operations; and the rollback handler module comprises the computer readable program code configured to carry out the partial rollback upon detection of the conflict.

11. An apparatus comprising:

a memory; and at least one processor, coupled to the memory, and operative to, while speculatively executing a given one of a plurality of transactions concurrently executing on a computer, wherein the plurality of transactions share multiple objects:

carry out write operations for the given transaction in a local data block of the given transaction;

automatically create an entry in a checkpoint log at a given time stamp upon a determination that a conflict probability with a given shared object is greater than a threshold value, and cancelling an automatic creation of the entry in the checkpoint log upon a determination that the conflict probability with the given shared object is less than the threshold value, wherein said automatically creating the entry comprises:

determining whether the given one of the multiple shared objects exists in the local data block of the given transaction at the given time stamp;

reading the value of the given shared object from a shared memory associated with the plurality of transactions if the given shared object does not exist in the local data block of the given transaction at the given time stamp;

writing the value of the given shared object at the local data block of the given transaction at the given time stamp; and creating the entry in the checkpoint log to identify (i) the given shared object and (ii) the local data block of the given transaction at the given time stamp;

continuously conflict check during read and tentative commit operations;

upon a determination that no conflict is detected in the read operation:

read locally if data to be read is in the local data block;

if the data to be read is not in the local data block, read from a shared object store if the data to be read is in the shared object store and is in sync with the shared memory; and otherwise read the data to be read from the shared memory;

upon a determination that no conflict is detected in the tentative commit operation:

write appropriate shared objects to the shared memory to obtain updated shared objects;

create a new entry in a conflict events store;

subsequent to the writing of the appropriate shared objects, for each transaction in an active reader list of the updated shared objects, set status flags to a red condition and redirecting conflict pointers to the new entry in the conflict events store; and remove the given one of the transactions from a global active transactions list;

carry out a partial rollback upon detection of a conflict event in the conflict checking step, the partial rollback being based upon the checkpoint log, wherein carrying out a partial rollback comprises:

identifying, in the checkpoint log, a safest checkpoint to roll back to wherein the safest checkpoint is an earliest log entry pertaining to a given one of the multiple shared objects in a write set of the conflict event;

applying a continuation of the safest checkpoint;

resetting a status flag of the given one of the transactions to a green condition; and proceeding with speculatively executing the given one of a plurality of transactions concurrently executing on a computer from the safest checkpoint.

12. The apparatus of claim 11, wherein the at least one processor is further operative to carry out the partial roll back by:

applying a continuation of the safest checkpoint;

resetting a status flag of the given one of the transactions to a green condition; and proceeding with the speculative execution at a rolled back transaction program location.

13. The apparatus of claim 12, wherein the at least one processor is further operative to identify the safest checkpoint by searching the checkpoint log to locate a first log entry pertaining to a pertinent one of the multiple shared objects in a write set of the conflict, and taking the first log entry pertaining to the pertinent one of the multiple shared objects as the safest checkpoint to roll back to.

14. The apparatus of claim 11, further comprising a computer-readable storage medium having distinct software modules embodied thereon, wherein the distinct software modules comprise a transaction handler module, a rollback handler module, a checkpoint generator module, and a commit handler module;

wherein:

the at least one processor is operative to carry out the write operations by executing the transaction handler module;

the at least one processor is operative to automatically create the entry in the checkpoint log by executing the checkpoint generator module;

the at least one processor is operative to continuously conflict check during the read and the tentative commit operations by executing the transaction handler module and the commit handler module; and the at least one processor is operative to carry out the partial rollback by executing the rollback handler module.

* * * * *